US012489790B2

(12) United States Patent
O'Neil et al.

(10) Patent No.: US 12,489,790 B2
(45) Date of Patent: Dec. 2, 2025

(54) DISTRIBUTED NETWORK APPLICATION SECURITY POLICY GENERATION AND ENFORCEMENT FOR MICROSEGMENTATION

(71) Applicant: Zscaler, Inc., San Jose, CA (US)

(72) Inventors: John H. O'Neil, Watertown, MA (US); Peter Smith, Acton, MA (US); Thomas Evan Keiser, Jr., Boston, MA (US)

(73) Assignee: Zscaler, Inc., San Jose, CA (US)

( * ) Notice: Subject to any disclaimer, the term of this patent is extended or adjusted under 35 U.S.C. 154(b) by 829 days.

(21) Appl. No.: 17/375,378

(22) Filed: Jul. 14, 2021

(65) Prior Publication Data

US 2021/0344723 A1    Nov. 4, 2021

Related U.S. Application Data

(63) Continuation-in-part of application No. 17/101,383, filed on Nov. 23, 2020, now Pat. No. 11,381,446, and
(Continued)

(51) Int. Cl.
*H04L 9/40* (2022.01)
*G06F 21/60* (2013.01)
*G06F 21/62* (2013.01)

(52) U.S. Cl.
CPC ............ *H04L 63/20* (2013.01); *G06F 21/606* (2013.01); *G06F 21/6218* (2013.01);
(Continued)

(58) Field of Classification Search
CPC ... H04L 63/20; H04L 63/0263; H04L 63/102; G06F 21/606; G06F 21/6218
(Continued)

(56) References Cited

U.S. PATENT DOCUMENTS

| 6,009,475 A | 12/1999 | Shrader |
| 6,138,162 A | 10/2000 | Pistriotto et al. |

(Continued)

FOREIGN PATENT DOCUMENTS

WO    2018152303 A1    8/2018

OTHER PUBLICATIONS

Aug. 13, 2019, International Preliminary Report on Patentability and Written Opinion for International Application No. PCT/US2018/015902.

(Continued)

*Primary Examiner* — Dant B Shaifer Harriman
(74) *Attorney, Agent, or Firm* — Baratta Law PLLC; Lawrence A. Baratta, Jr.

(57) ABSTRACT

Systems and methods for microsegmentation include receiving network communication information that describes flows between hosts in a network and applications executed on the hosts; generating a network communication model based on the network communication information that labels flows; and providing polices to the hosts based on the network communication model where the policies cause performance a set of actions, locally at a host, on any of the flows based on corresponding labels. The labels are one of healthy and unhealthy. The set of actions include blocking, allowing, and allowing for a period of time before confirmation.

20 Claims, 20 Drawing Sheets

Related U.S. Application Data a continuation-in-part of application No. 16/587,839, filed on Sep. 30, 2019, now Pat. No. 11,522,890, and a continuation-in-part of application No. 16/578,175, filed on Sep. 20, 2019, now Pat. No. 11,070,591, which is a continuation-in-part of application No. 16/214,843, filed on Dec. 10, 2018, now abandoned, said application No. 16/587,839 is a continuation of application No. 15/899,453, filed on Feb. 20, 2018, now Pat. No. 10,439,985, said application No. 16/214,843 is a continuation of application No. 15/883,534, filed on Jan. 30, 2018, now Pat. No. 10,154,067.

(60) Provisional application No. 62/459,248, filed on Feb. 15, 2017, provisional application No. 62/457,508, filed on Feb. 10, 2017.

(52) U.S. Cl.
CPC ........ *H04L 63/0263* (2013.01); *H04L 63/102* (2013.01); *H04L 63/30* (2013.01)

(58) Field of Classification Search
USPC ............................................................ 726/1
See application file for complete search history.

(56) References Cited

U.S. PATENT DOCUMENTS

| | | | |
|---|---|---|---|
| 7,316,029 | B1 | 1/2008 | Parker et al. |
| 7,383,569 | B1 | 6/2008 | Elgressy et al. |
| 7,620,985 | B1 | 11/2009 | Bush et al. |
| 8,166,533 | B2 | 4/2012 | Yuan |
| 8,499,348 | B1 | 7/2013 | Rubin |
| 8,677,471 | B2 | 3/2014 | Karels et al. |
| 8,856,920 | B2 * | 10/2014 | Khan ................... H04L 63/306 713/153 |
| 9,773,107 | B2 | 9/2017 | White et al. |
| 9,787,639 | B1 * | 10/2017 | Sun ..................... H04L 63/0263 |
| 10,154,067 | B2 | 12/2018 | Smith et al. |
| 10,212,044 | B2 * | 2/2019 | Mermoud ............ G06N 3/0495 |
| 10,348,599 | B2 | 7/2019 | O'Neil et al. |
| 10,362,048 | B2 | 7/2019 | Alexander et al. |
| 10,439,985 | B2 | 10/2019 | O'Neil |
| 10,505,899 | B1 | 12/2019 | Singh et al. |
| 10,956,513 | B2 * | 3/2021 | Ahmed .................. G06N 20/00 |
| 11,128,664 | B1 * | 9/2021 | Andersson .......... H04L 63/1441 |
| 2005/0193222 | A1 | 9/2005 | Greene |
| 2006/0095970 | A1 | 5/2006 | Rajagopal et al. |
| 2006/0129670 | A1 * | 6/2006 | Mayer ................. H04L 41/0894 709/223 |
| 2012/0137375 | A1 * | 5/2012 | Ramachandran ..... H04L 63/105 726/28 |
| 2014/0282829 | A1 * | 9/2014 | Dabbiere ................ G06F 21/62 726/1 |
| 2015/0326486 | A1 * | 11/2015 | Zawadowskiy ..... H04L 12/6418 709/224 |
| 2016/0359897 | A1 * | 12/2016 | Yadav ................. H04L 41/0806 |
| 2017/0078329 | A1 | 3/2017 | Hwang et al. |
| 2017/0272465 | A1 | 9/2017 | Steele |
| 2018/0041471 | A1 | 2/2018 | Sudo et al. |
| 2019/0349283 | A1 | 11/2019 | O'Neil et al. |
| 2020/0021618 | A1 | 1/2020 | Smith et al. |
| 2024/0061388 | A1 * | 2/2024 | Ganju ................ G05B 23/0243 |
| 2024/0291831 | A1 * | 8/2024 | Tembey .................. G06F 9/547 |

OTHER PUBLICATIONS

Aug. 20, 2019, International Preliminary Report on Patentability and Written Opinion for International Application No. PCT/US2018/018325.

\* cited by examiner

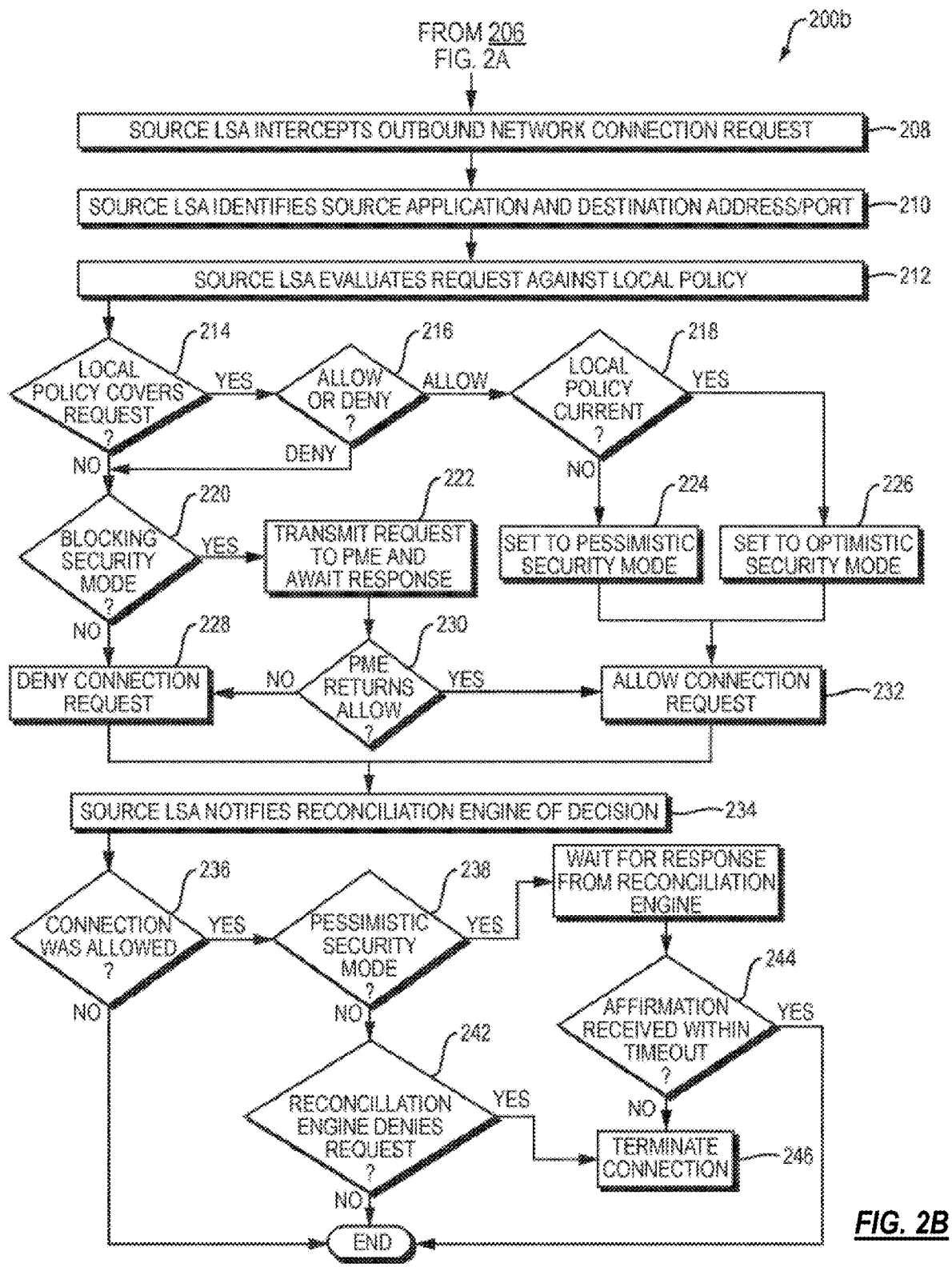

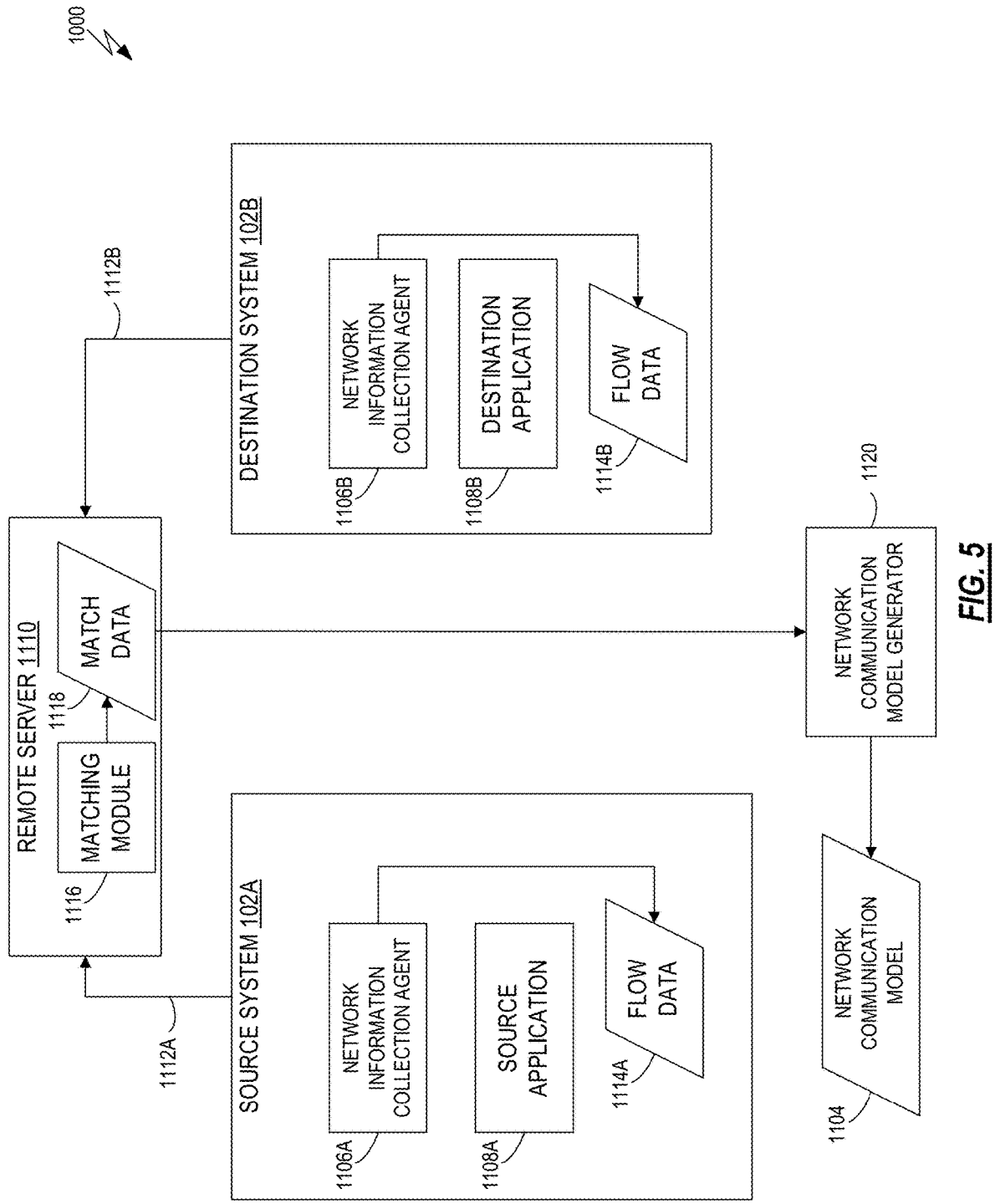

DISTRIBUTED NETWORK APPLICATION SECURITY POLICY GENERATION AND ENFORCEMENT FOR MICROSEGMENTATION

CROSS-REFERENCE TO RELATED APPLICATION(S)

The present disclosure is a continuation-in-part of U.S. patent application Ser. No. 16/578,175, filed Sep. 20, 2019, which is now U.S. Pat. No. 11,070,591, issued Jul. 20, 2021, which was a continuation-in-part of U.S. patent application Ser. No. 16/214,843, filed Dec. 10, 2018, now abandoned, which was a continuation of U.S. patent application Ser. No. 15/883,534, filed Jan. 30, 2018, which is now U.S. Pat. No. 10,154,067, issued Dec. 11, 2018, which claimed priority to U.S. Provisional Patent Application No. 62/457,508, filed Feb. 10, 2018, the contents of each of the preceding patents and patent applications are incorporated by reference in their entirety.

Also, the present disclosure is a continuation-in-part of U.S. patent application Ser. No. 16/587,839, filed Sep. 30, 2019, which is a continuation of U.S. patent application Ser. No. 15/899,453, filed Feb. 20, 2018, which is now U.S. Pat. No. 10,439,985, issued Oct. 8, 2019, which claimed priority to U.S. Provisional Patent Application No. 62/459,248, filed Feb. 15, 2017, the contents of each of the preceding patents and patent applications are incorporated by reference in their entirety.

Also, the present disclosure is a continuation-in-part of U.S. patent application Ser. No. 17/101,383, filed Nov. 23, 2020, the contents of each of the preceding patents and patent applications are incorporated by reference in their entirety.

FIELD OF THE DISCLOSURE

The present disclosure generally relates to networking. More particularly, the present disclosure relates to systems and methods for distributed network application security policy generation and enforcement for microsegmentation.

BACKGROUND OF THE DISCLOSURE

Flat networks increase risk in the cloud and data centers. A flat network is one where various hosts are interconnected in a network with large segments. Flat networks allow excessive access via unprotected pathways that allow attackers to move laterally and compromise workloads in cloud and data center environments. Experts agree that shrinking segments and eliminating unnecessary pathways is a core protection strategy for workloads. However, the cost, complexity, and time involved in network segmentation using legacy virtual firewalls outweighs the security benefit. The best-known approaches to network security require that each host on a network and each application have the least possible access to other hosts and applications, consistent with performing their tasks. In practice, this typically requires creating large numbers of very fine-grained rules that divide a network into many separate subnetworks, each with its own authority and accessibility. This is referred to as "segmentation" (or referred to as "microsegmentation," which is described herein and the differences with segmentation) and is a key aspect of so-called Zero Trust Network Access (ZTNA). Shrinking network segments advantageously eliminates unnecessary attack paths and reduces the risk of compromises. Workload segmentation advantageously stops the lateral movement of threats and prevents application compromises and data breaches. ZTNA, also known as the Software-Defined Perimeter (SDP), is a set of technologies that operates on an adaptive trust model, where trust is never implicit, and access is granted on a "need-to-know," least-privileged basis defined by granular policies.

In practice, it is very difficult to perform segmentation well. Knowing in detail what functions a network is performing and then crafting hundreds or thousands of precise rules for controlling access within the network is a process that often takes years and is prone to failure. Crafting such rules is difficult and expensive to perform manually precisely because it requires humans to perform several tasks that humans find it difficult to perform well, such as understanding big data and writing large sets of interacting rules. Legacy network security is complex and time-consuming to deploy and manage. Address-based, perimeter controls, such as via firewalls, were not designed to protect internal workload communications. As a result, attackers can "piggyback" on approved firewall rules. Application interactions have complex interdependencies. Existing solutions translate "application speak" to "network speak," resulting in thousands of policies that are almost impossible to validate. Stakeholders need to be convinced that the risk will be reduced. Can security risk be reduced without breaking the application? Practitioners struggle to measure the operational risk of deploying complex policies accurately.

While all agree segmentation reduces risk, there is uncertainty in practice that it can be applied effectively.

Applications connected by network infrastructure communicate with each other in order to share data and perform business operations. The connection between a source application and a destination application is established by the source application, which requests a connection from its Internet Protocol (IP) address to the IP address of the destination application, typically over a specific port. Typically, existing host-based network security technologies, such as personal firewalls, allow or restrict directional access specifically at the egress or ingress point of the communication on the host on which the communication is occurring. For example, the firewall running on the host on which the source application executes typically monitors the outbound connection attempt to the destination IP address, while the firewall running on the host on which the destination application executes typically monitors the inbound connection attempt from the source IP address. Each such security component operates in relative isolation from the other, and generally only has visibility into the network-related information of the other side (e.g., IP address, port, protocol), and not into the identity of the application executing on the other host.

The limited information available to each host in such a communication restricts the types of decisions that existing security technologies can make, and allows for the hosts that are party to communications to be exploited, such as by spoofing their legitimate IP addresses to make or receive unauthorized communications.

BRIEF SUMMARY OF THE DISCLOSURE

A system validates the establishment and/or continuation of a connection between two applications over a network using a two-stage process: (1) a local security agent executing on the same source system as the source application validates the connection against a set of policies stored locally on the source system; and (2) a local security agent executing on the same destination system as the destination application validates the connection against a set of policies stored locally on the destination system. The connection is allowed or blocked depending on the outcome of the two-stage validation. Before the validation process, a policy enforcement engine distributes copies of a trusted public certificate to the source and destination local security agents, which extend their local copies of the certificate to enable them to enforce policies without the use of a backend system. This validation system protects against policy violations that are not detected by traditional systems, and does so without requiring alterations to the source application, the destination application, or the network traffic between them.

Embodiments of the present invention generate network communication policies by applying machine learning to existing network communications, and without using information that labels such communications as healthy or unhealthy. The resulting policies may be used to validate communication between applications (or services) over a network.

Systems and methods for microsegmentation include receiving network communication information that describes flows between hosts in a network and applications executed on the hosts; generating a network communication model based on the network communication information that labels flows; and providing polices to the hosts based on the network communication model where the policies cause performance a set of actions, locally at a host, on any of the flows based on corresponding labels. The labels are one of healthy and unhealthy. The set of actions include blocking, allowing, and allowing for a period of time before confirmation.

Other features and advantages of various aspects and embodiments of the present invention will become apparent from the following description and from the claims.

BRIEF DESCRIPTION OF THE DRAWINGS

The present disclosure is illustrated and described herein with reference to the various drawings, in which like reference numbers are used to denote like system components/ method steps, as appropriate, and in which:

FIGS. 2A-2C are flowcharts of a method for performing the symmetrical validation of FIG. 1 according to one embodiment of the present invention.

FIG. 5 is a dataflow diagram of a system for generating network application security policies according to one embodiment of the present invention.

DETAILED DESCRIPTION OF THE DISCLOSURE

Embodiments of the present invention perform symmetrical validation of communication between applications (or services) over a network, using agents installed on the same systems as the applications (or services), and without the need for validation by a central system. Such validation enables an imposter application to be detected and prevented from communicating even if the imposter application communicates, or attempts to communicate, using the same name and communication content as a permitted application. Embodiments of the present invention achieve this result by validating applications using application fingerprints that can distinguish permitted from prohibited applications based on features other than mere application name and communication content. Additional details and embodiments of the present invention will be described in more detail below.

Also, embodiments of the present invention generate network communication policies by applying machine learning to existing network communications. The resulting policies may be used to validate communication between applications (or services) over a network. For example, policies generated by embodiments of the present invention may, for example, be enforced using techniques disclosed in the commonly-owned and concurrently-filed provisional patent application entitled, "Network Application Security Policy Enforcement." This is merely an example, however, and not a limitation of embodiments of the present invention. Policies generated using embodiments of the present invention may be enforced in any way, including ways other than those disclosed in the "Network Application Security Policy Enforcement" patent application.

Validation of policies generated by embodiments of the present invention enables an imposter application to be detected and prevented from communicating even if the imposter application communicates, or attempts to communicate, using the same name and communication content as a permitted application. This result may be achieved by validating applications using application fingerprints that can distinguish permitted applications from prohibited applications based on features other than mere application name and communication content. Additional details and embodiments of the present invention will be described in more detail below.

The term "application," as used herein, includes both applications and services. Therefore, any reference herein to an "application" should be understood to refer to an application or a service.

Network Application Security Policy Enforcement

Figure 1:
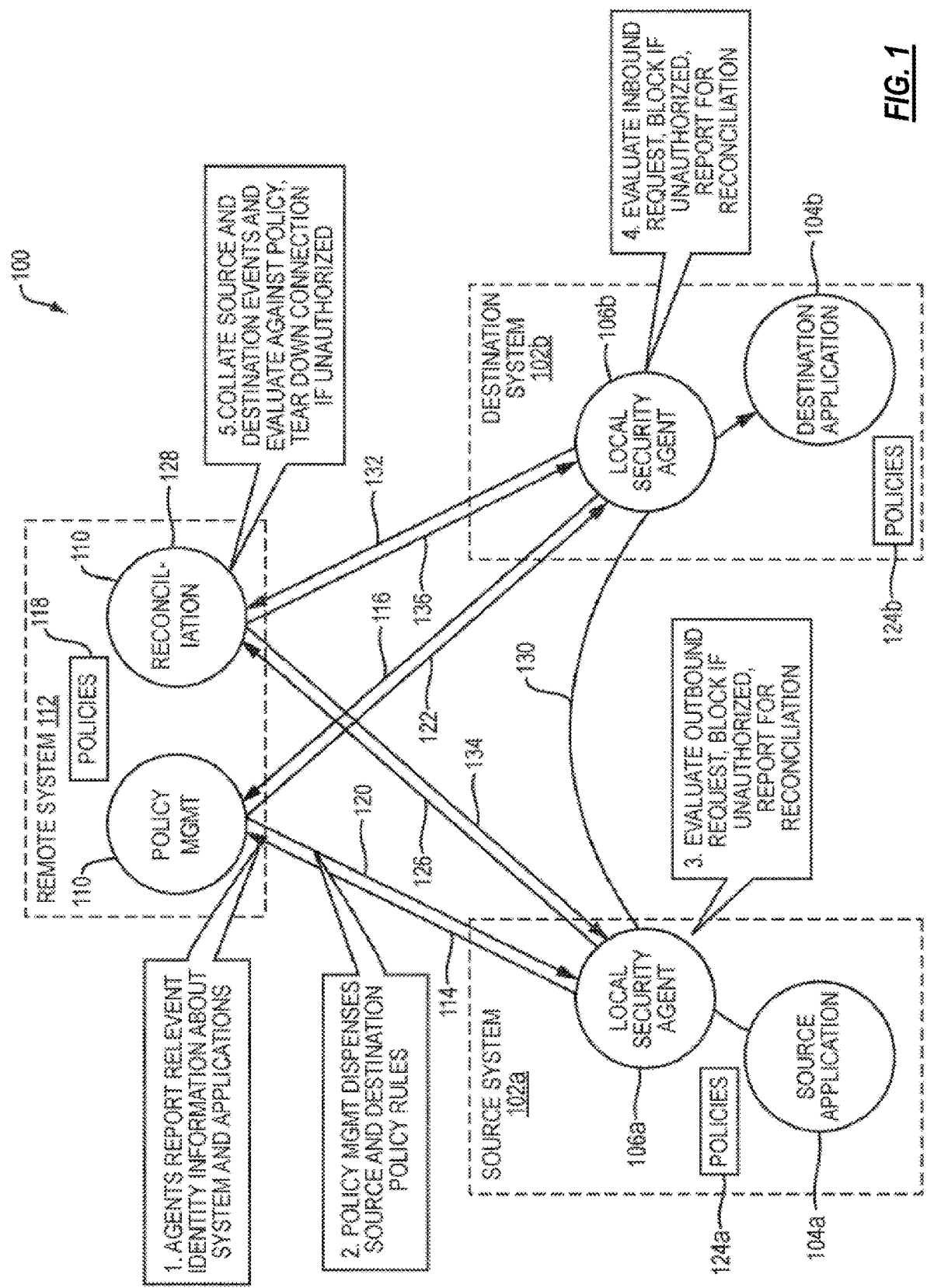
FIG. 1 is a dataflow diagram of a system for performing symmetrical validation of communications between applications over a network according to one embodiment of the present invention.
Figure 2A:
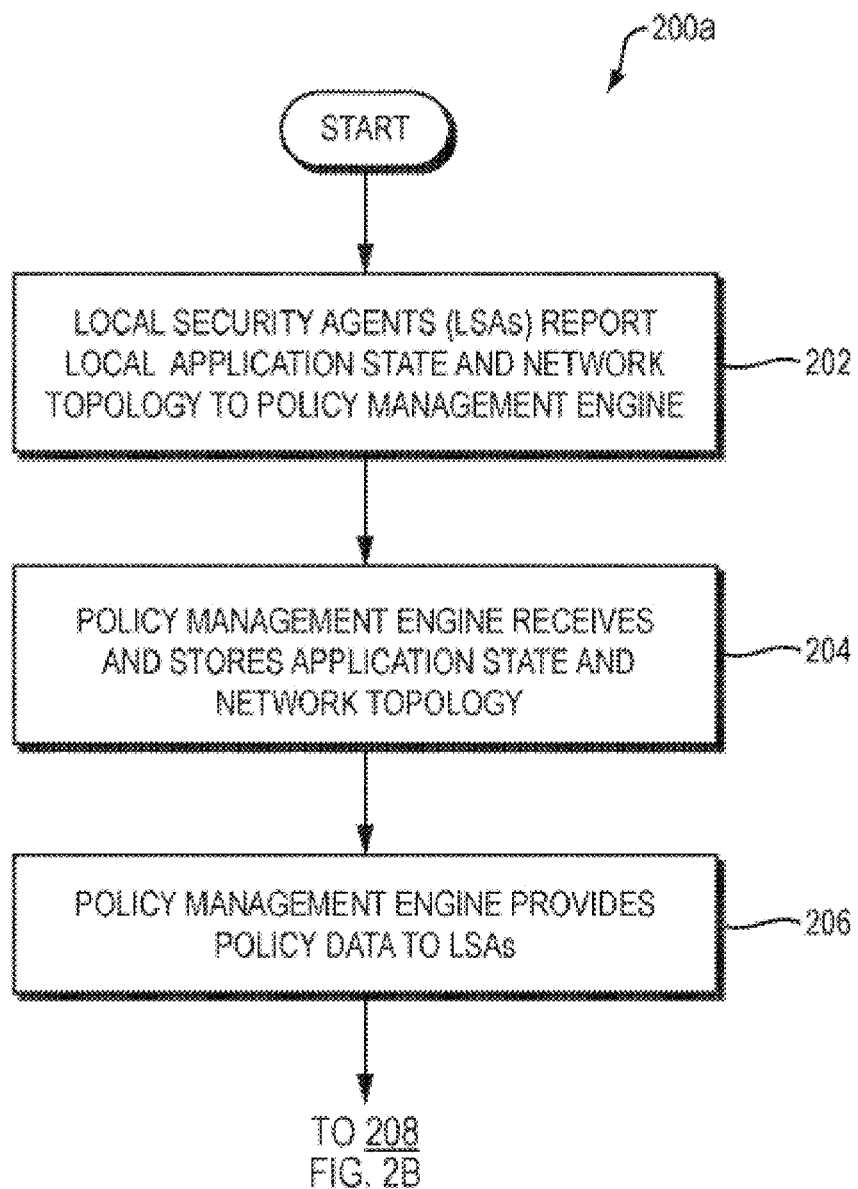

Referring to FIG. 1, a dataflow diagram is shown of a system 100 for performing symmetrical validation of communication between applications over a network. Referring to FIG. 2A, a flowchart is shown of a method 200a performed by a policy management engine 110 according to one embodiment of the present invention.

The system 100 includes a source system 102a and a destination system 102b. A "system," as that term is used herein (e.g., the source system 102a and/or destination system 102b), may be any device and/or software operating environment that is addressable over an Internet Protocol (IP) network. For example, each of the source system 102a and the destination system 102b may be any type of physical or virtual computing device, such as a server computer, virtual machine, desktop computer, laptop computer, tablet computer, smartphone, or wearable computer. The source system 102a and the destination system 102b may have the same or different characteristics. For example, the source system 102a may be a smartphone and the destination system 102b may be a server computer. A system (such as the source system 102a and/or destination system 102b) may include one or more other systems, and/or be included within another system. As merely one example, a system may include a plurality of virtual machines, one of which may include the source system 102a and/or destination system 102b.

The source system 102a and destination system 102b are labeled as such in FIG. 1 merely to illustrate a use case in which the source system 102a initiates communication with the destination system 102b. In practice, the source system 102a may initiate one communication with the destination 102b and thereby act as the source for that communication, and the destination system 102b may initiate another communication with the source system 102a and thereby act as the source for that communication. As these examples illustrate, each of the source system 102a and the destination system 102b may engage in multiple communications with each other and with other systems, and may act as either the source or destination in those communications. Furthermore, the system 100 may include additional systems, all of which may perform any of the functions disclosed herein in connection with the source system 102a and the destination system 102b.

The source system 102a includes a source application 104a (which may, for example, be installed and executing on the source system 102a) and the destination system 102b includes a destination application 104b (which may, for example, be installed and executing on the destination system 102b). Each of these applications 104a and 104b may be any kind of application, as that term is used herein. The source application 104a and the destination application 104b may have the same or different characteristics. For example, the source application 104a and destination application 104b may both be the same type of application or even be instances of the same application. As another example, the source application 104a may be a client application and the destination application 104b may be a server application, or vice versa.

An embodiment will now be described for enforcing security policies on a communication that the source system 102a attempts to initiate with the destination system 102b. In this embodiment, the source system 102a includes a local security agent 106a and the destination system 102b includes a local security agent 106b. More generally, a local security agent may be contained within (e.g., installed and executing on) any system that executes one or more applications to which the security techniques disclosed herein are to be applied. A local security agent may, for example, execute within the same operating system on the same system as the application(s) that the local security agent monitors. Each such local security agent (e.g., the local security agents 106a and 106b) may include any combination of hardware and/or software for performing the functions disclosed herein.

The system 100 also includes a policy management engine 110. The policy management engine may include any combination of hardware and/or software for performing the functions disclosed herein. In the particular embodiment illustrated in FIG. 1, the policy management engine 110 is contained within (e.g., installed and executing on) a remote system 112. The remote system 112 may be any device and/or software application that is addressable over an IP network. For example, the remote system 112 may be any type of computing device, such as a server computer, virtual machine, desktop computer, laptop computer, tablet computer, smartphone, or wearable computer. The remote system 112 and the source and destination systems 102a-b may have the same or different characteristics. For example, the source and destination systems 102a-b may be smartphones and the remote system 112 may be a server computer.

Some or all of the local security agents 106a-b may report the state of the local applications as well as the state of the network on their system to the policy management engine 110 (FIG. 2A, operation 202). For example, in FIG. 1, the local security agent 106a is on the same system as and monitors the source application 104a. The local security agent 106a may, therefore, obtain state information about the source application 104a and report some or all of that state information, and/or information derived therefrom, to the policy management engine 110. Although in the example of FIG. 1 only one source application 104a is shown on the source system 102a, any number of source applications may execute on the source system 102a, and the local security agent 106a may obtain and report state information for some or all of such source applications to the policy management engine 110. The local security agent 106a may also report information about the network configuration on source system 102a that will help the policy management engine 110 identify system 102a to other systems independent of the applications that may be executing. The local security agent 106a may also report information about the system network topology of the source system 102a, such as its IP addresses and/or Address Resolution Protocol (ARP) cache. All such reporting is represented by communication 114 in FIG. 1. Such communication 114 may be implemented in any of a variety of ways, such as by the local security agent 106a transmitting (e.g., via IP and/or another network communication protocol) one or more messages containing the obtained application state and network configuration information to the policy management engine 110.

Similarly, the local security agent 106b on the destination system 102b may obtain and transmit state information for the destination application 104b (and for any other applications executing on the destination system 102b) and for the network configuration information of destination system 102b and transmit such information via communication 116 to the policy management engine 110 in any of the ways disclosed above in connection with the local security agent 106a, the source system 102a, the source application 104a, and the communication 114.

The policy management engine 110 may receive the transmitted state information 114 and 116 and store some or all of it in any suitable form (FIG. 2A, operation 204). As described above, such state information may include both application state information and network topology information (e.g., addresses, listening ports, broadcast zones). The policy management engine 110 may, for example, store such state information 114 and 116 in a log (e.g., database) of state information received from one or more local security agents (e.g., local security agents 106a-b) over time. Such a log may include, for each unit of state information received, an identifier of the system (e.g., source system 102a or destination system 102b) from which the state information was received. In this way, the policy management engine 110 may build and maintain a record of application state and network configuration information from various systems over time.

The policy management engine 110 may include or otherwise have access to a set of policies 118, which may be stored in the remote system 112. In general, each of the policies 118 specifies both a source application and a destination application, and indicates that the source application is authorized (or not authorized) to communicate with the destination application. A policy may specify, for the source and/or destination application, any number of additional attributes of the source and/or destination application, such as any one or more of the following, in any combination: user(s) who are executing the application (identified, e.g., by username, group membership, or other identifier), system(s), network subnet, and time(s). A policy may identify its associated source and/or destination application using an application fingerprint which may, for example, identify the application by its name and any other attribute(s) which may be used to authenticate the validity and identify of an application, such as any one or more of the following in any combination: filename, file size, cryptographic hash of contents, and digital code signing certificates associated with the application. An application fingerprint in a policy may include other information for its associated source and/or destination application, such as the IP address and port used by the application to communicate, whether or not such information is used to define the application.

The policy management engine 118 provides, to one or more systems in the system 100 (e.g., the source system 102a and destination system 102b), policy data, obtained and/or derived from the policies, representing some or all of the policies that are relevant to the system to which the policy data is transmitted, which may include translating applications into IP address/port combinations (FIG. 2A, operation 206). For example, the policy management engine 110 may identify a subset of the policies 118 that are relevant to the source system 102a and transmit a communication 120 representing the identified subset of policies to the source system 102a. The source system 114a may receive the communication 120 and store source system policy data 124a, representing the received policies, in the source system 102a. Similarly, the policy management engine 110 may identify a subset of the policies 118 that are relevant to the destination system 102b and transmit a communication 122 representing the identified subset of policies to the destination system 102b. The destination system 114b may receive the communication 122 and store destination system policy data 124b, representing the received policies, in the destination system 102b.

The policy management engine 110 may identify the subset of the policies 118 that are relevant to a particular system (e.g., the source system 102a and/or the destination system 102b) in any of a variety of ways. For example, the policy management engine 110 may identify a policy as relevant to a system if the policy refers to an IP address of the system or an application that is installed and/or executing on the system.

The policy management engine 110 may extract the policy data that is relevant to the systems 102a and 102b and transmit the resulting policy data communications 120 and 122 in response to any of a variety of triggers. For example, the policy management engine 110 may extract and transmit relevant policy data (in the form of instances of the communications 120 and 122) to the systems 102a and 102b:

periodically (e.g., every second, every minute, or at any scheduled times); [0025] in response to a change in the master policy data;

in response to a change in network topology, e.g., an assignment of a network address to one of the systems 102a-b or a change in an assignment of an existing address;

in response to a new application executing on one of the systems 102a-b;

in response to an existing application in the system 100 changing or adding a port on which it is listening for connections;

in response to an unexpected condition on systems 102a-b or other systems in the network.

The policy management engine 110 may only transmit updated policy data to one of the systems 102a and 102b if the updates are relevant to that system. Regardless of the trigger, in response to receiving the relevant policy data 120 and 122, the systems 102a and 102b may update their local policy data 124a and 124b in accordance with the received communications 120 and 122, respectively. Receiving and maintaining updated copies of relevant policy data enables local systems, such as the systems 102a and 102b, to apply the policies that are relevant to them without the need to communicate with a remote system or component, such as the remote system 112 or policy management engine 110.

Before describing the system 100 and methods 200a-c in more detail, it will be useful to note that the system 100 may operate in one of at least three security modes in relation to any particular connection between two applications (e.g., the source application 104a and the destination application 104b):

(1) Optimistic: The connection between the two applications is allowed unless and until the reconciliation engine 128 instructs the agents associated with those applications to terminate the connection due to a policy violation.

2) Pessimistic: The connection between the two applications is terminated after a specified amount of time has passed if the reconciliation engine 128 does not affirmatively instruct the agents associated with those applications to keep the connection alive.

(3) Blocking: The connection between the two applications is blocked unless and until the reconciliation engine 128 affirmatively instructs the agents associated with those applications to allow the connection.

Note that the system 100 may, but need not, operate in the same security mode for all connections within the system 100. The system 100 may, for example, operate in optimistic security mode for some connections, operate in pessimistic security mode for other connections, and operate in blocking security mode for yet other connections. As yet another example, the system 100 may switch from one mode to another for any given connection or set of connections in response to detected conditions, as will be described in more detail below.

Referring now to FIG. 2B, a flowchart is shown of a method 200b that is performed by the source local security agent 106a in one embodiment of the present invention to process an outgoing connection request. Note that although the method 200b of FIG. 2B may be performed following the method 200a performed by the policy management agent 110 in FIG. 2A, this is merely an example and not a requirement of the present invention. Rather, the method 200b of FIG. 2B (and the method 200c of FIG. 2C) may operate independently of the method 200a of FIG. 2A.

Now consider an example in which the source application 104a makes a network request to communicate with the destination application 104b. Although this particular example will be described in connection with this particular request, the techniques disclosed herein may be applied more generally to any request made by any application to communication with any other application.

The local security agent that is on the same system as the requesting application, which in this example is the local security agent 106a that is on the same system 102a as the requesting application 104a, detects that the requesting application 104a has made the communication request, intercepts the request, and blocks the request from proceeding further at least until the source local security agent 106a has evaluated whether the request matches a local policy (FIG. 2B, operation 208). The local security agent 106a identifies, based on the request, the application 104a that is the source of the request (FIG. 2B, operation 210). The local security agent 106a evaluates the request against the locally stored policies 124a in order to determine whether to allow or deny the request based on any one or more of the following, in any combination: the identity of the source application 104a, the IP address and port of the destination application 104b, some or all of the contents of the request, and the local policy data 124a (FIG. 2B, operation 212).

The local security agent 106a determines, based on its evaluation, whether one of the local policies 124a covers the communication request (FIG. 2B, operation 214). If one of the local policies 124a does cover the request, then the local security agent 106a determines whether the covering policy allows or denies the request (FIG. 2B, operation 216). If the covering policy allows the request, then the local security agent 106a determines whether the covering policy is current (FIG. 2B, operation 218). The local security agent 106a may determine whether the covering policy is current in any of a variety of ways. For example, in certain embodiments, the policy management engine 110 may inform the local security agent 106a that particular policies are current or not current. The local security agent 106a may treat any particular policy as current in response to being informed by the policy management engine 110 that the policy is current, unless and until the policy management engine 110 subsequently informs the local security agent 106a that the policy is no longer current. As another example, the local security agent 106a may convert the status of a policy from current to not current after some predetermined amount of time has passed from when the local security agent 106a previously set the status of the policy to current.

If the covering policy is current, then the local security agent 106a sets its security mode to optimistic mode (FIG. 2B, operation 226); otherwise, the local security agent 106a sets its current security mode to pessimistic security mode (FIG. 2B, operation 224). If the covering policy allows the request, then the local security agent 106a allows the request (FIG. 2B, operation 232), regardless of whether the local policy is current.

If, in operation 232 of FIG. 2B, the local security agent 106a decides to allow the communication request, then, in general, the local security agent 106a allows the communication request to be transmitted to the destination application 104b. Such transmission may occur using traditional techniques. In other words, the local security agent 106a may unblock the communication request and permit it to be transmitted normally.

If, in operation 214, the local security agent 106a determines that none of the local policies 124a covers the request, or, in operation 216, the local security agent 106a determines that the covering policy denies the request, then the local security agent 106a determines whether its current security mode is blocking security mode (FIG. 2B, operation 220). Furthermore, note that the local policies 124a may include a policy which specifically indicates the action to be performed if none of the local policies 124a covers the request. If the local policies 124a include such a policy, then the local security agent 106a may perform the action specified by that policy if the local security agent 106a determines that none of the local policies 124a covers the request.

If the local security agent 106a's current security mode is blocking security mode, then the local security agent 106a transmits the request to the policy management engine 110 and awaits a response from the policy management engine 110 (FIG. 2B, operation 222). The policy management engine 110 then evaluates the request against the central policies 118 and sends a response to the local security agent 106a indicating whether the request should be allowed or denied, based on the central policies 118. The local security agent 106a receives the response 120 from the policy management engine 110 and determines whether the response 120 indicates that the request should be allowed or denied (FIG. 2B, operation 230). If the response 120 from the policy management engine 110 indicates that the request 130 should be allowed, then the local security agent 106a allows the connection request (FIG. 2B, operation 232); otherwise, the local security agent 106a denies the connection request (FIG. 2B, operation 228). The local security agent 106a also denies the connection request (FIG. 2B, operation 228) if, in operation 220, the local security agent 106a determines that its current security mode is not blocking security mode.

Regardless of whether the local security agent 106a allows or denies the request (FIG. 2B, operations 232 or 228), the local security agent 106a notifies a reconciliation engine 128 on the remote system 112 of the decision, such as by transmitting a communication 126 to the reconciliation engine 128 (FIG. 2B, operation 234). The communication 126 may include any of a variety of information, such as data representing one or more of the following: the identity of the source application 104a, the destination IP address and port, and the decision made by the local security agent 106a (e.g., allow or deny). The reconciliation engine 128 may receive and store the communication 126 in any of the ways disclosed herein in connection with the receipt and storage of the communication 114 by the policy management engine 110.

The local security agent 106a may or may not wait to receive a response from the reconciliation engine 128 before proceeding, depending on the local security agent 106a's current security mode. More specifically, the local security agent 106*a* determines whether it previously denied the connection request 130 in operation 228 or allowed the connection request 130 in operation 232 (FIG. 2B, operation 236). If the connection request 130 was denied, not allowed, the local security agent does not take any further action.

If, instead, the connection request was allowed and was accepted by the destination system 102*b*, then the local security agent 106*a* determines whether it is currently operating in pessimistic security mode (FIG. 2B, operation 238). If the local security agent 106*a* is currently operating in pessimistic security mode, then the local security agent 106*a* waits to receive a response from the reconciliation engine 128 (FIG. 2B, operation 240). If the local security agent 106*a* does not receive a response within some predetermined timeout period or receives a response indicating the connection does not reconcile with current policies (FIG. 2B, operation 244), then the local security agent 106*a* terminates the connection (FIG. 2B, operation 246). If the local security agent 106*a* receives a response that confirms the connection reconciles with current policy, the local security agent 106*a* leaves the connection active by not taking any action.

If the local security agent 106*a* is not currently operating in pessimistic security mode (FIG. 2B, operation 238), then, if the response received by the local security agent 106*a* from the reconciliation engine 128 denies the request, then the local security agent 106*a* terminates the connection (FIG. 2B, operation 246). If, in operation 242, the reconciliation engine 128 allows the request, the local security agent 106*a* leaves the connection active by not taking any action.

Figure 2C:
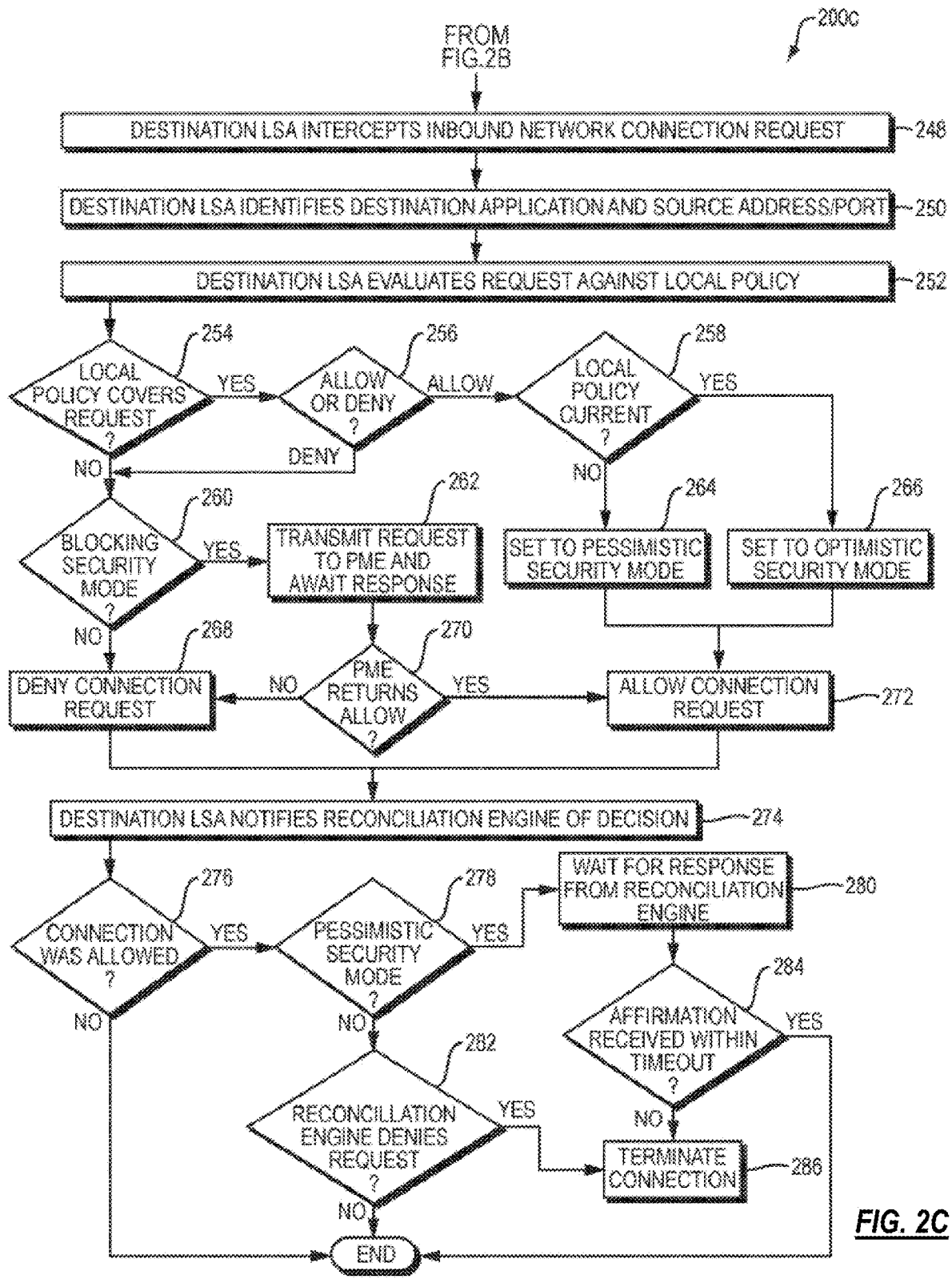

Referring now to FIG. 2C, a flowchart is shown of a method 200*c* that is performed by the destination local security agent 106*b* in one embodiment of the present invention to process the incoming connection request 130 from the source application 104*a*. Note that although the method 200*c* of FIG. 2C is illustrated as being performed after the method 200*b* performed by the source local security agent 106*a* in FIG. 2A, this is merely an example and not a requirement of the present invention. For example, the method 200*c* of FIG. 2C may begin before the method 200*b* of FIG. 2B has completed. As a particular example, the method 200*c* of FIG. 2C may begin after the source local security agent 106*a* transmits the connection request 130 to the destination system 102*b*, and before the remainder of the method 200*b* completes.

The destination local security agent 106*b* intercepts the inbound connection request 130 transmitted by the source local security agent 106*a*, and blocks the request from proceeding further at least until the destination local security agent 106*b* has evaluated whether the request 130 matches a local policy (FIG. 2C, operation 248). The local security agent 10*ba* identifies, based on the request, the application 104*b* that is the destination of the request (FIG. 2C, operation 250). The local security agent 106*b* evaluates the request 130 against the locally stored policies 124*b* in order to determine whether to allow or deny the request 130 based on any one or more of the following, in any combination: the identity of the destination application 104*b*, the IP address and port of the source application 104*a*, some or all of the contents of the request 130, and the local policy data 124*b* (FIG. 2C, operation 252).

The local security agent 106*b* determines, based on its evaluation, whether one of the local policies 124*b* covers the communication request 130 (FIG. 2C, operation 254). If one of the local policies 124*b* does cover the request, then the local security agent 106*b* determines whether the covering policy allows or denies the request (FIG. 2C, operation 256). If the covering policy allows the request, then the local security agent 106*b* determines whether the covering policy is current (FIG. 2C, operation 258). The local security agent 106*b* may determine whether the covering policy is current in any of a variety of ways. For example, in certain embodiments, the policy management engine 110 may inform the local security agent 106*b* that particular policies are current or not current. The local security agent 106*b* may treat any particular policy as current in response to being informed by the policy management engine 110 that the policy is current, unless and until the policy management engine 110 subsequently informs the local security agent 106*b* that the policy is no longer current. As another example, the local security agent 106*b* may convert the status of a policy from current to not current after some predetermined amount of time has passed from when the local security agent 106*b* previously set the status of the policy to current.

If the covering policy is current, then the local security agent 106*b* sets its security mode to optimistic mode (FIG. 2C, operation 266); otherwise, the local security agent 106*b* sets its current security mode to pessimistic security mode (FIG. 2C, operation 264). If the covering policy allows the request 130, then the local security agent 106*b* allows the request 130 (FIG. 2C, operation 272), regardless of whether the local policy is current.

If, in operation 272 of FIG. 2C, the local security agent 106*a* decides to allow the communication request 130, then, in general, the local security agent 106*b* allows the communication request 130 to be provided to the destination application. In other words, the local security agent 106*b* may unblock the communication request 130 so that it may be received by the destination application 104*b*.

If, in operation 254, the local security agent 106*b* determines that none of the local policies 124*b* covers the request 130, or, in operation 256, the local security agent 106*b* determines that the covering policy denies the request 130, then the local security agent 106*b* determines whether its current security mode is blocking security mode (FIG. 2C, operation 260). If the local security agent 106*b*'s current security mode is blocking security mode, then the local security agent 106*b* transmits the request 130 to the policy management engine 110 and awaits a response from the policy management engine 110 (FIG. 2C, operation 262). The policy management engine 110 then evaluates the request 130 against the central policies 118 and sends a response to the local security agent 106*b* indicating whether the request should be allowed or denied, based on the central policies 118. The local security agent 106*b* receives the response 122 from the policy management engine 110 and determines whether the response 122 indicates that the request 130 should be allowed or denied (FIG. 2C, operation 270). If the response 122 from the policy management engine 110 indicates that the request 130 should be allowed, then the local security agent 106*b* allows the connection request 130 (FIG. 2C, operation 272); otherwise, the local security agent 106*b* denies the connection request 130 (FIG. 2C, operation 268). The local security agent 106*b* also denies the connection request 130 (FIG. 2C, operation 268) if, in operation 260, the local security agent 106*b* determines that its current security mode is not blocking security mode.

Regardless of whether the local security agent 106*b* allows or denies the request 130 (FIG. 2B, operations 272 or 268), the local security agent 106*b* notifies the reconciliation engine 128 on the remote system 112 of the decision, such as by transmitting a communication 132 to the reconciliation engine 128 (FIG. 2C, operation 274). The communication 132 may include any of a variety of information, such as data representing one or more of the following: the identity of the destination application 104b, the source IP address and port, and the decision made by the local security agent 106b (e.g., allow or deny). The reconciliation engine 128 may receive and store the communication 132 in any of the ways disclosed herein in connection with the receipt and storage of the communication 114 by the policy management engine 110.

The local security agent 106b may or may not wait to receive a response from the reconciliation engine 128 before proceeding, depending on the local security agent 106b's current security mode. More specifically, the local security agent 106b determines whether it previously denied the connection request 130 in operation 268 or allowed the connection request 130 in operation 272 (FIG. 2C, operation 276). If the connection request 130 was denied, not allowed, the local security agent does not take any further action and the destination application 104b does not receive the request.

If, instead, the connection request was allowed and was accepted by the destination application 104b, then the local security agent 106b determines whether it is currently operating in pessimistic security mode (FIG. 2C, operation 278). If the local security agent 106b is currently operating in pessimistic security mode, then the local security agent 106b waits to receive a response from the reconciliation engine 128 (FIG. 2C, operation 270). If the local security agent 106b does not receive a response within some predetermined timeout period or receives a response indicating the connection does not reconcile with current policies (FIG. 2C, operation 274), then the local security agent 106b terminates the connection (FIG. 2C, operation 266). If the local security agent 106b receives a response that confirms the connection reconciles with current policy, the local security agent 106b leaves the connection active by not taking any action.

If the local security agent 106b is not currently operating in pessimistic security mode (FIG. 2C, operation 278), then, if the response 136 received by the local security agent 106b from the reconciliation engine 128 denies the request, then the local security agent 106b terminates the connection (FIG. 2C, operation 286). If, in operation 282, the reconciliation engine 128 allows the request, the local security agent 106b leaves the connection active by not taking any action.

As described above, the source and destination local security agents 106a-b notify the reconciliation engine 128 of their decisions regarding the connection request, in operation 234 of FIG. 2B and operation 274 of FIG. 2C, respectively. The reconciliation engine 128, in response to receiving the communication 126 from the source local security agent 106a and the communication 132 from the destination local security agent 106b, collates the data from the two communications 126 and 132 and determines, based on the collated data, whether the collated data indicates that the communication matches any of the policies 118. The reconciliation engine 128 then notifies both the source local security agent 106a and the destination local security agent 106b of its decision, via communications 134 and 136, respectively. The ways in which the source and destination local security agents 106a-b process the communications 134 and 136 are described above in connection with operations 240/242 and 280/282 of FIGS. 2B and 2C, respectively.

The net effect of the method 200 shown in FIGS. 2A-2C is that: [0060] the source local security agent 106a makes an informed decision about whether to allow or deny the connection request based on the information available to it at the time; [0061] if the connection is allowed, the destination local security agent 106b makes an informed decision about whether to allow or deny the request based on the information available at the time; [0062] if both the source and destination local security agents 106a-b allow the communication request, then the reconciliation engine 128 attempts to confirm the decisions of the source and destination local security agents 106a and may either reaffirm those decisions or override them.

A specific example of an application of the system 100 of FIG. 1 and the methods 200a-c of FIGS. 2A-2C will now be described. Assume that the source application 104a is an application named "WebApp" and that the source system 102a has the IP address 192.168.1.1. Further assume that the destination application 104b is an application named "Database" and that the destination system 102b has the IP address 192.168.1.2, and that the "Database" is listening on port 3306. Further assume that the policies 118 include a policy which indicates that the "Database" application is permitted to receive connections from "WebApp" source applications.

The local security agent 106a reports to the policy management engine that it is running application "WebApp" and that its system has an IP address of 192.168.1.1 (communication 114). The local security agent 106b reports to the policy management engine 110 that the application "Database" is running and it is listening on IP address 192.168.1.2, port 3306 (communication 116). The policy management engine 110 informs the source local security agent 106a that application "WebApp" may communicate with 192.168.1.2 over port 3306 (communication 120). The policy management engine 110 informs the destination local security agent 106b that application "Database" may receive communication from 192.168.1.1 (communication 114).

The "WebApp" application initiates a connection request to IP address 192.168.1.2, port 3306. Because this matches a local policy that was received from the policy management engine 110, the local security agent 106a uses the techniques disclosed above to allow the connection request 130 to be transmitted to the destination system 102b and to inform the reconciliation engine that the application named "WebApp" that is executing has initiated a connection request from IP address 192.168.1.1 to IP address 192.168.1.2, port 3306.

On the destination system 102b, IP address 192.168.1.2 on port 3306 receives an inbound request from IP address 192.168.1.1. Because this matches a local policy that was received from the policy management engine 110, the destination local security agent 106b uses the techniques disclosed above to receive the connection request 130, to allow the connection request 130 to be provided to the "Database" application, and to informs the reconciliation engine 128 that the application named "Database" that is executing and listening on IP address 192.168.1.2, port 3306, has received a connection request from IP address 192.168.1.1.

The reconciliation engine 128 collates the information it has received from the source and destination local security agents 106a-b, using any of a variety of data in the received information (e.g., timestamp and/or packet header information). In this example, there are two pieces of information: "WebApp' requested an outbound connection from 192.168.1.1 to 192.168.1.2:3306" and "'Database' listening on 192.168.1.2:3306 received an inbound connection request from 192.168.1.1". The result of this collation is a conclusion by the reconciliation engine 128 that an application named "WebApp" is attempting to make a connection from 192.168.1.1 to an application named "Database" on 192.168.1.2, port 3306. The reconciliation engine 128 determines that this connection request matches the policy which indicates that the "Database" application is permitted to receive connections from "WebApp" applications and, in response to this determination, sends a positive confirmation back to the source local security agent 106a and the destination local security agent 106b, indicating that the requested connection satisfies the policies 118. In response to receiving these confirmations, the source and destination local security agents 106a-b take no further action.

Although in the embodiment of FIGS. 1 and 2A-2B, the reconciliation engine 128 notifies both the source local security agent 106a and the destination local security agent 106b, via the communications 134 and 136, of the reconciliation engine 128's policy decision in relation to the request 130, alternatively the reconciliation engine 128 may only notify one of the local security agents 106a and 106b. For example, if the reconciliation engine 128 notifies the source local security agent 106a that the request 130 violates one of the policies 118 either before or after the request 130 has been transmitted to the destination application 104b on the destination system 102b, then the source local security agent 106a may, in response to such a notification, either not provide the request 130 to, or terminate the connection if already established with, the destination system 102b. As a result, it would not be necessary for the reconciliation engine 128 to notify the destination local security agent 106b of the policy violation in order to prevent a connection from being established between the source application 104a and the destination application 104b.

Similarly, if the reconciliation engine 128 notifies the destination local security agent 106b that the request 130 violates one of the policies 118, even after the source local security agent 106a has transmitted the request 130 to the destination system 102b, then the destination local security agent 106b may, in response to such a notification, either deny the request 130 and not provide the request 130 to the destination application 104b, or terminate the connection if it has already been allowed. As a result, it would not be necessary for the reconciliation engine 128 to notify the source local security agent 106a of the policy violation in order to prevent a connection from being established between the source application 104a and the destination application 104b.

Furthermore, although both the source system 102a and the destination system 102b in FIG. 1 have their own local security agents 106a and 106b, respectively, this is merely an example and does not constitute a limitation of the present invention. Alternatively, for example, only one of the two systems 102a and 102b may have a local security agent. As particular examples, the source system 102a may have its local security agent 106a, while the destination system 102b may omit the local security agent 106b. Conversely, the destination system 102b may have its local security agent 106b, while the source system 102a may omit its local security agent 106a. Although in these embodiments only one of the two systems 102a and 102b, and the reconciliation engine 128, may validate the communication request against the central policies 118 and one of the local policies 124a and 124b, such embodiments still provide the benefit of some validation, even if less than in the full system 100 employing three-part validation shown in FIG. 1.

Although the policy management engine 110 is shown in FIG. 1 as being separate and remote from the source system 102a and the destination system 102b, this is merely an example and not a limitation of the present invention. More generally, the policy management engine 110 may be implemented in any one or more of the following ways, in any combination:

as a single component, located remotely from and network-accessible to, the source system 102a and destination system 102b, as shown in FIG. 1;

as a plurality of components which are partially or entirely redundant, located remotely from and network-accessible to, the source system 102a and destination system 102b;

as a single component located within one of the source and destination systems 102a and 102b, respectively, and network-accessible to the other systems; and as a plurality of components which are partially or entirely redundant and location within one or more of the source and destination systems 102a and 102b, and optionally network-accessible to the other systems.

Similarly, although the reconciliation engine 128 is shown in FIG. 1 as being separate and remote from the source system 102a and the destination system 102b, this is merely an example and not a limitation of the present invention. More generally, the reconciliation engine 128 may be implemented in any of the ways described above in connection with the policy management engine 110.

Although the local security agents 106a and 106b are shown in FIG. 1 as being contained solely within the respective source and destination systems 102a and 102b, this is merely an example and not a limitation of the present invention. Each of the local security agents 106a and 106b may perform three functions: (1) gathering information about applications executing on the same system (e.g., applications 104a and 104b) and the listening ports against which these applications may be bound; (2) gathering information about the network addresses available on the same system, and (3) enforcing the local policies 124a and 124b. Any of the local security agents 106a and 106b in the systems 102a and 102b may perform any, but not all of these functions, in which case the function not performed locally by the local security agent may be performed remotely by another component not contained within the same system as the local security agent. As one particular example, the local security agent 106a in the source system 102a may perform the functions of gathering information about applications executing on the source system 102a (e.g., source application 104a) and the network addresses available on the source system, but not perform the function of executing local policies 124a, which may be performed by another component (such as a firewall configured to perform the policy enforcement functions disclosed herein) that is not in the source system 102a. As yet another example, all of the functions of gathering application and network address information and policy enforcement may be performed remotely from the system (e.g., systems 102a and 102b) to which those functions are applied.

The description herein refers to blocking or not allowing network connections to be created, and to terminating existing network connections, in response to determining that a policy would be or has been violated. Such blocking/terminating may be applied to: (1) the specific connection that would violate or has violated a policy; (2) all connections that originate from the same source as a connection that would violate or has violated a policy, and which exist or have been requested at the time the policy violation has been detected; (3) all connections that originate from the same source as a connection that would violate or has violated a policy, including both connections that exist or have been requested at the time the policy violation has been detected, and connections requested in the future (possibly until some time limit has been reached or some other condition has been satisfied); and (4) throttling connections originating from the same source as the connection that has been determined to violate the policy.

Although certain embodiments have been described herein as being applied to a request to establish a network connection (such as the request 130), this is merely an example and not a limitation of the present invention. Alternatively or additionally, embodiments of the present invention may apply the techniques disclosed herein to all content (e.g., every packet) communicated within an existing connection, or to selected content (e.g., periodically sampled packets) within an existing connection.

Figure 3:
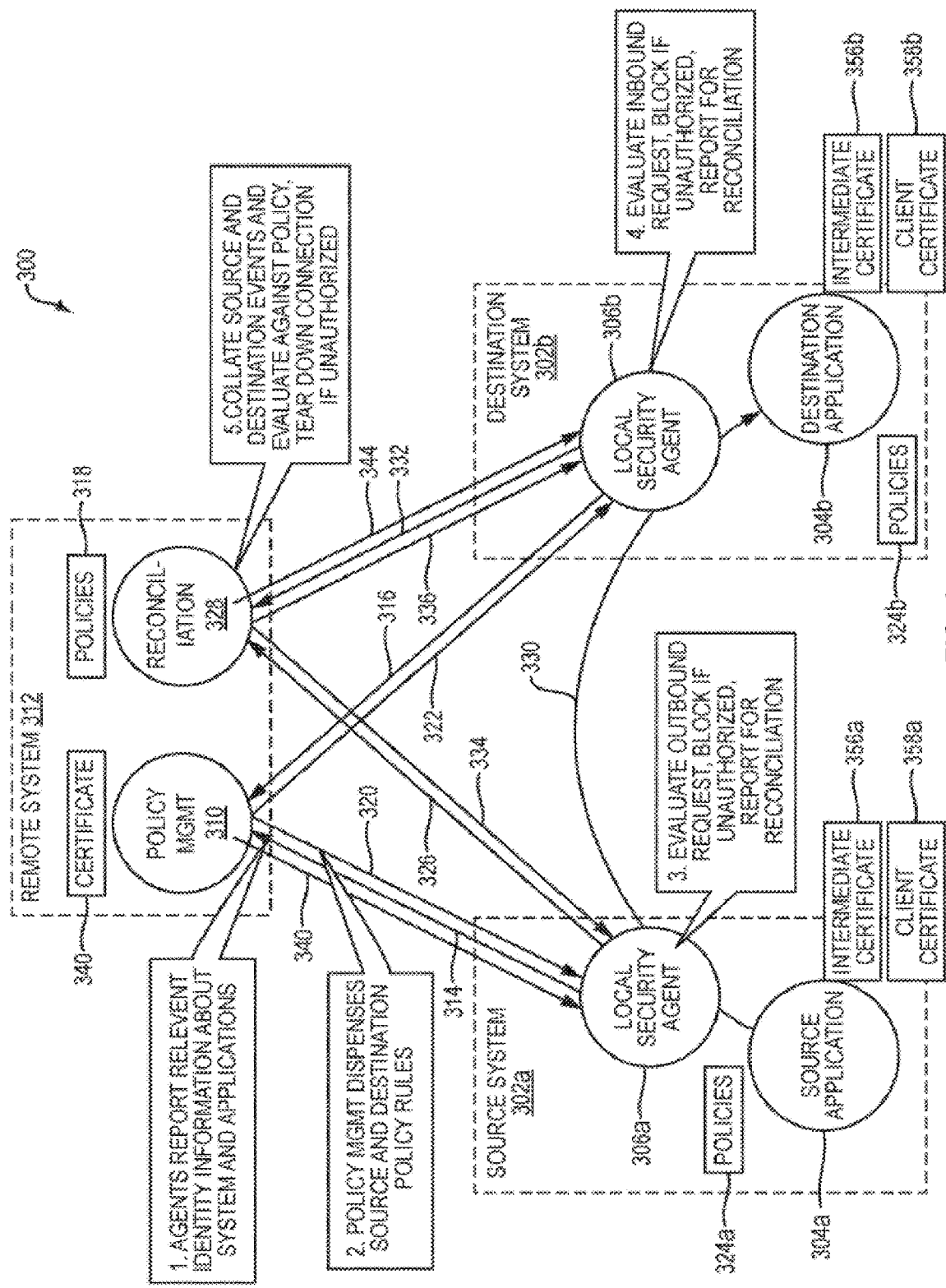
FIG. 3 is a dataflow diagram of a system for performing symmetrical validation of communications between applications over a network without using a backend system for policy enforcement according to one embodiment of the present invention.
Figure 4A:
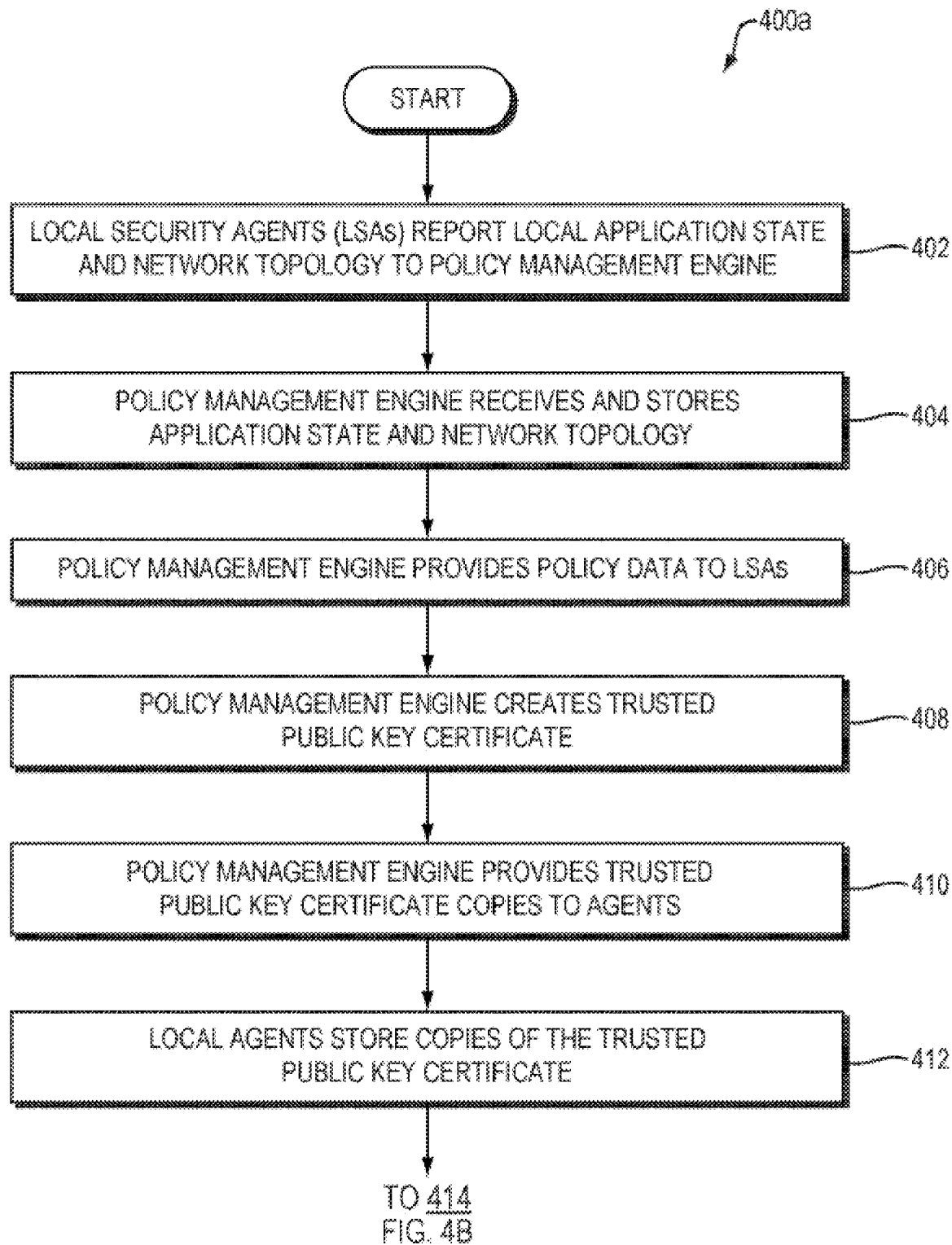
FIGS. 4A-4C are flowcharts of a method for performing the symmetrical validation of FIG. 3 according to one embodiment of the present invention.

Referring to FIG. 3, a dataflow diagram is shown of a system 300 for performing symmetrical validation of communication between applications over a network. Referring to FIG. 4A, a flowchart is shown of a method 400a performed by a policy management engine 310 according to one embodiment of the present invention.

The system 100 includes a source system 302a and a destination system 302b. The source system 302a of FIG. 3 may have any of the properties disclosed herein in connection with the source system 102a of FIG. 1. Similarly, the destination system 302b of FIG. 3 may have any of the characteristics disclosed herein in connection with the destination system 102a of FIG. 3.

The source system 302a includes a source application 304a (which may, for example, be installed and executing on the source system 302a) and the destination system 302b includes a destination application 304b (which may, for example, be installed and executing on the destination system 302b). The source application 304a of FIG. 3 may have any of the characteristics disclosed herein in connection with the source application 104a of FIG. 1. Similarly, the destination application 304b of FIG. 3 may have any of the characteristics disclosed herein in connection with the destination application 104b of FIG. 1.

An embodiment will now be described for enforcing security policies on a communication that the source system 302a attempts to initiate with the destination system 302b. In this embodiment, the source system 302a includes a local security agent 306a (which may have any of the characteristics of the local security agent 106a of FIG. 1) and the destination system 302b includes a local security agent 306b (which may have any of the characteristics of the local security agent 106b of FIG. 1).

The system 300 also includes a policy management engine 310, which may have any of the characteristics of the policy management engine 110 of FIG. 1. Some or all of the local security agents 306a-b may report the state of the local applications as well as the state of the network on their system to the policy management engine 310 (FIG. 4A, operation 402), such as in any of the ways disclosed herein in connection with operation 202 of FIG. 2A.

Similarly, the local security agent 306b on the destination system 302b may obtain and transmit state information for the destination application 304b (and for any other applications executing on the destination system 302b) and for the network configuration information of destination system 103b and transmit such information via communication 316 to the policy management engine 310 in any of the ways disclosed above in connection with the local security agent 306a, the source system 302a, the source application 304a, and the communication 314.

The policy management engine 310 may receive the transmitted state information 314 and 316 and store some or all of it in any suitable form (FIG. 4A, operation 404), such as in any of the ways disclosed herein in connection with operation 204 of FIG. 2A.

The policy management engine 310 may include or otherwise have access to a set of policies 318, which may be stored in the remote system 312. In general, each of the policies 318 specifies both a source application and a destination application, and indicates that the source application is authorized (or not authorized) to communicate with the destination application. The policies 318 may have any of the characteristics disclosed herein in connection with the policies 118 of FIG. 1.

The policy management engine 310 provides, to one or more systems in the system 300 (e.g., the source system 302a and destination system 302b), policy data, obtained and/or derived from the policies, representing some or all of the policies that are relevant to the system to which the policy data is transmitted, which may include translating applications into IP address/port combinations (FIG. 4A, operation 406), such as in any of the ways disclosed herein in connection with operation 206 of FIG. 2A.

Like the system 100 of FIG. 1, the system 300 of FIG. 3 may operate in an Optimistic, Pessimistic, or Blocking security modes, which are described in more detail above.

The policy management engine 310 creates a trusted public key certificate 340 (such as an X.509 root certificate) (FIG. 4A, operation 408). The policy management engine 310 distributes (via communications 342 and 344) copies of the certificate 340 to the agents 306a and 306b, respectively (FIG. 4A, operation 410). The agents 306a and 306b store their copies of the certificate 340 as certificate copies 356a and 356b, respectively (FIG. 4A, operation 412).

Although X.509 is provided above as an example of a public key certificate infrastructure, this is merely an example and not a limitation of the present invention. Other public key certificate infrastructures may be used. One benefit of X.509 is that it allows a host or website to create a document that proves the ownership of a public key. It used public-key encryption to guarantee that the document is valid. In addition to identity, the certificate may include other information. As described below, embodiments of the present invention may use the information in the X.509 certificate to create a "web of trust" among the agents 106a-b, so that they can trust the information they have received from a (putative) other agent and act on it.

Figure 4B:
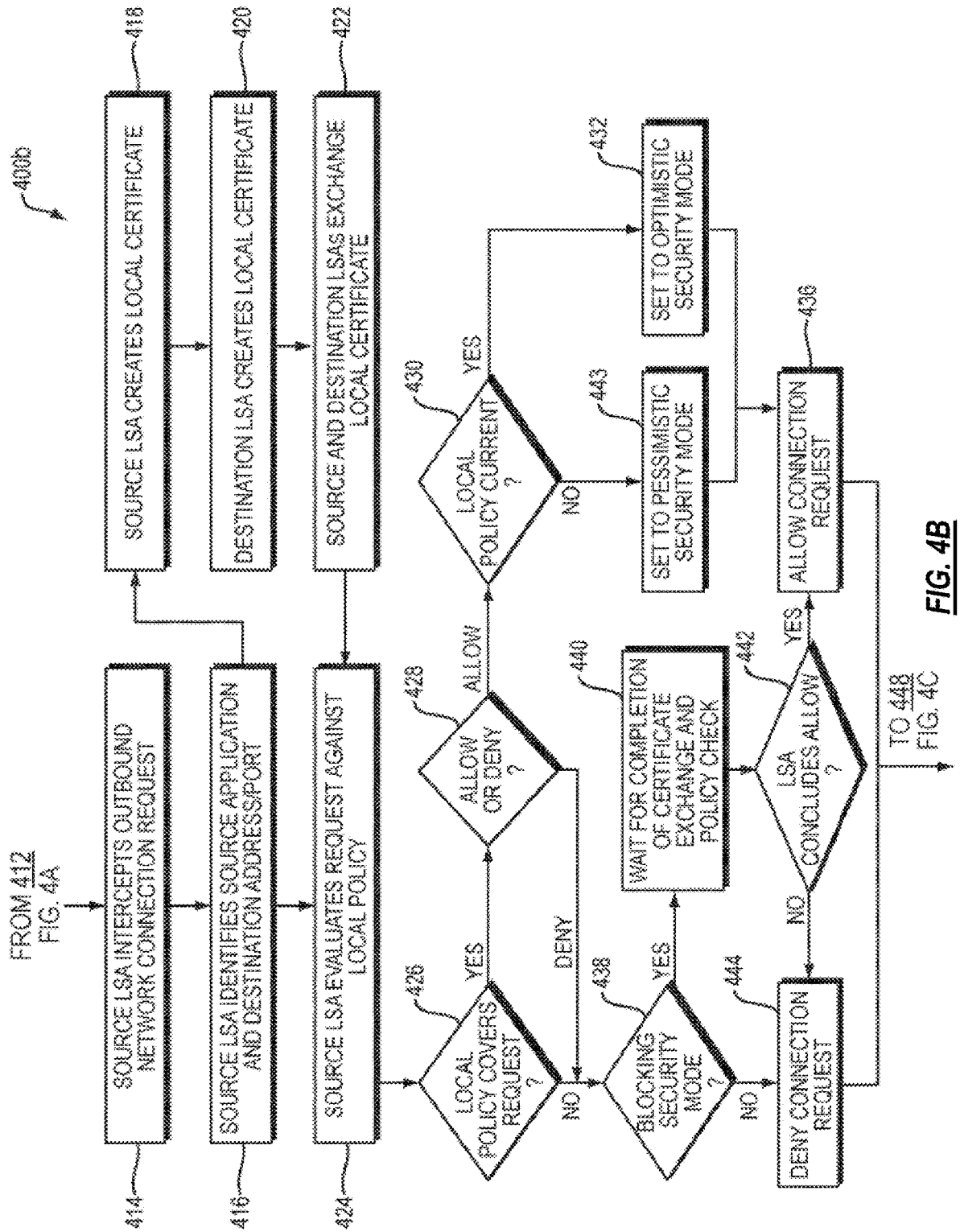

Referring now to FIG. 4B, a flowchart is shown of a method 400b that is performed by the source local security agent 306a in one embodiment of the present invention to process an outgoing connection request. Note that although the method 400b of FIG. 4B may be performed following the method 400a performed by the policy management agent 310 in FIG. 4A, this is merely an example and not a requirement of the present invention. Rather, the method 400b of FIG. 4B (and the method 400c of FIG. 4C) may operate independently of the method 400a of FIG. 4A.

Now consider an example in which the source application 304a makes a network request to communicate with the destination application 304b. Although this particular example will be described in connection with this particular request, the techniques disclosed herein may be applied more generally to any request made by any application to communication with any other application.

The local security agent that is on the same system as the requesting application, which in this example is the local security agent 306a that is on the same system 302a as the requesting application 304a, detects that the requesting application 304a has made the communication request, intercepts the request, and blocks the request from proceeding further at least until the source local security agent 306a has evaluated whether the request matches a local policy (FIG. 4B, operation 414). The local security agent 306a identifies, based on the request, the application 304a that is the source of the request (FIG. 4B, operation 416).

Recall that the local security agents 306a-b have already received and stored intermediate signing certificates 356a-b, respectively, from the policy management engine 310. The policy management engine 310 is a source that is trusted a priori by both of the local security agents 306a-b. Furthermore, the intermediate certificates 356a-b are derived from common root certificate 340, which is known only to the policy management engine 310.

After the source local security agent 306a intercepts the outgoing communication request, the source local security agent 306a creates its own local certificate 358a, referred to herein as a "client certificate," based on the local intermediate certificate 356a (FIG. 4B, operation 418). In general, the client certificate 358a extends the certificate chain and trustworthiness of the intermediate certificate 356a. For example, the local security agent 306a may create the client certificate 358a based on the intermediate certificate 356a by adding, to the intermediate certificate 356a: (1) identifying metadata of the source system 302a on which the local security agent 306a resides; and (2) application fingerprint information for the source application 304a.

Similarly, the destination local security agent 306b creates its own local client certificate 358b based on the local intermediate certificate 356b (FIG. 4B, operation 420). In general, the client certificate 358b extends the certificate chain and trustworthiness of the intermediate certificate 356b. For example, the local security agent 306b may create the client certificate 358b based on the intermediate certificate 356b by adding, to the intermediate certificate 356b: (1) identifying metadata of the destination system 302b on which the local security agent 306b resides; and (2) application fingerprint information for the destination application 304b.

The local security agents 306a-b then exchange their respective client certificates 358a-b, such as by using the mTLS protocol (FIG. 4B, operation 422).

The client certificates 358a-b are based on the root certificate 340. The root certificate 340 has already been signed by the policy management engine 310, and also received by the security agents 306a-b, and this ends the involvement of the policy management engine 310. Because the root certificate 340 includes a cryptographic signature, proving it originates from the backend (e.g., the policy management engine 310), the client certificates 358a-b, which extend the root certificate 340, are also trusted just as the root certificate 340 is trusted. When the client certificates 358a-b are exchanged, the receiver of the client certificate can trust that the sender possesses a root certificate and hence that the information it sends may be trusted.

Both of the local security agents 306a-b then have the information required to decide whether their local policies 324a-b, respectively, will allow (or refuse) the communication request from the source application 304a, without the involvement of the remote system 312. Specific examples of techniques for making the allow/refuse decision will now be described.

The local security agent 306a evaluates the request against the locally stored policies 324a in order to determine whether to allow or deny the request based on any one or more of the following, in any combination: the identity of the source application 304a, the IP address and port of the destination application 304b, some or all of the contents of the request, and the local policy data 324a (FIG. 4B, operation 424).

The local security agent 306a determines, based on its evaluation, whether one of the local policies 324a covers the communication request (FIG. 4B, operation 426). If one of the local policies 324a does cover the request, then the local security agent 306a determines whether the covering policy allows or denies the request (FIG. 4B, operation 428). If the covering policy allows the request, then the local security agent 306a determines whether the covering policy is current, such as in any of the ways disclosed above in connection with FIG. 2B (FIG. 4B, operation 430).

If the covering policy is current, then the local security agent 306a sets its security mode to optimistic mode (FIG. 4B, operation 432); otherwise, the local security agent 306a sets its current security mode to pessimistic security mode (FIG. 4B, operation 434). If the covering policy allows the request, then the local security agent 306a allows the request (FIG. 4B, operation 436), regardless of whether the local policy is current.

If, in operation 428 of FIG. 4B, the local security agent 306a decides to allow the communication request, then, in general, the local security agent 306a allows the communication request to be transmitted to the destination application 304b. Such transmission may occur using traditional techniques. In other words, the local security agent 306a may unblock the communication request and permit it to be transmitted normally.

If, in operation 426, the local security agent 306a determines that none of the local policies 324a covers the request, or, in operation 428, the local security agent 306a determines that the covering policy denies the request, then the local security agent 306a determines whether its current security mode is blocking security mode (FIG. 4B, operation 438). Furthermore, note that the local policies 324a may include a policy which specifically indicates the action to be performed if none of the local policies 324a covers the request. If the local policies 324a include such a policy, then the local security agent 306a may perform the action specified by that policy if the local security agent 306a determines that none of the local policies 324a covers the request.

If the local security agent 306a's current security mode is blocking security mode, then the local security agent 306a waits until both the client certification exchange is completed and until the information from the certificate has been used to check with respect to the relevant set of policies whether to allow or deny the communication (FIG. 4B, operation 442). If the local security agent 306a determines that the request should be allowed, then the local security agent 306a allows the connection request (FIG. 4B, operation 436); otherwise, the local security agent 106a denies the connection request (FIG. 4B, operation 444). The local security agent 306a also denies the connection request (FIG. 4B, operation 444) if, in operation 438, the local security agent 306a determines that its current security mode is not blocking security mode.

Figure 4C:
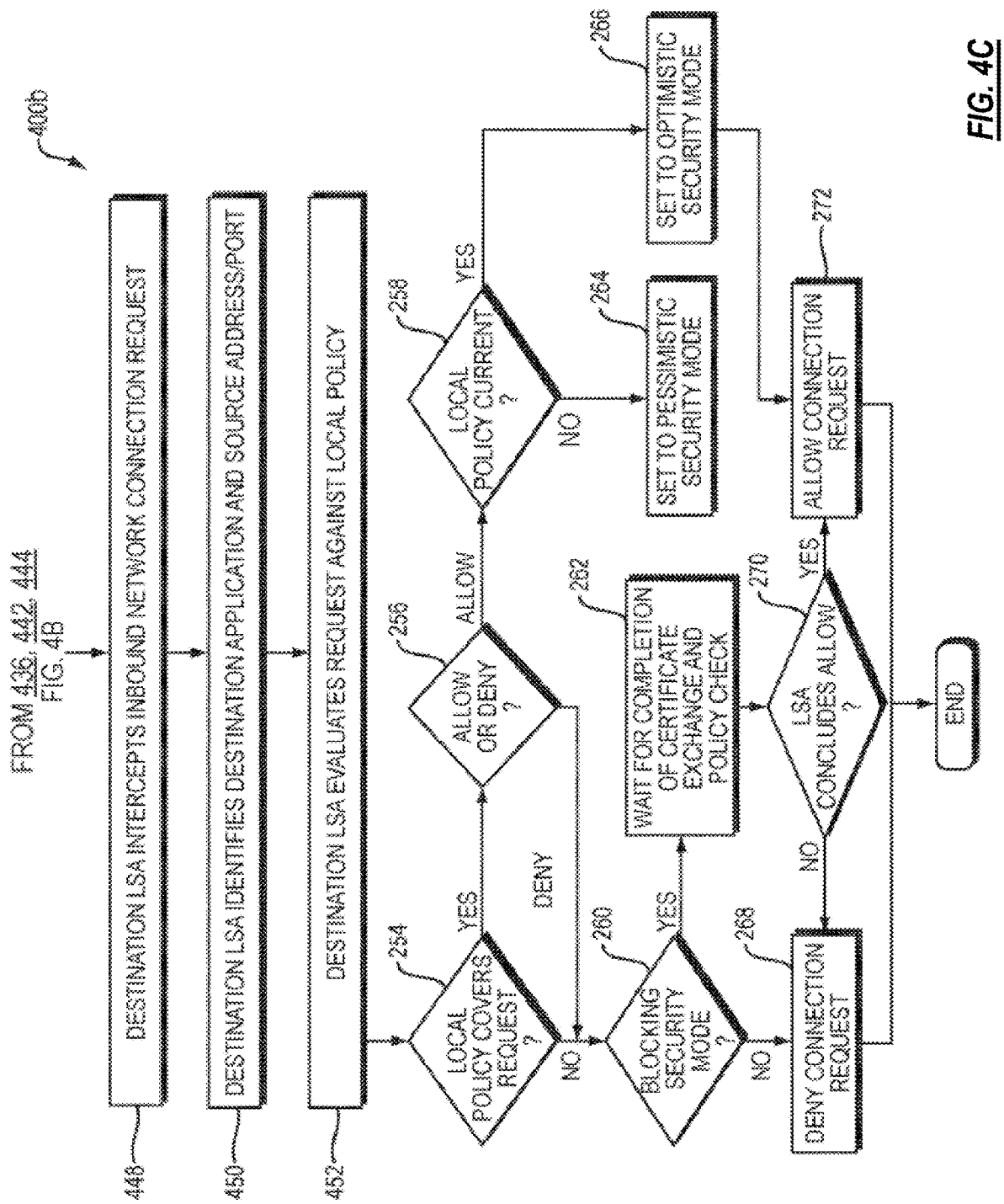

Referring now to FIG. 4C, a flowchart is shown of a method 400c that is performed by the destination local security agent 306b in one embodiment of the present invention to process the incoming connection request 330 from the source application 304a. Note that although the method 400c of FIG. 4C is illustrated as being performed after the method 400b performed by the source local security agent 306a in FIG. 4A, this is merely an example and not a requirement of the present invention. For example, the method 400c of FIG. 4C may begin before the method 400b of FIG. 4B has completed. As a particular example, the method 400c of FIG. 4C may begin after the source local security agent 306a transmits the connection request 330 to the destination system 302b, and before the remainder of the method 400b completes.

The destination local security agent 306b intercepts the inbound connection request 330 transmitted by the source local security agent 306a, and blocks the request 330 from proceeding further at least until the destination local security agent 306b has evaluated whether the request 330 matches a local policy (FIG. 4C, operation 448). The local security agent 306b identifies, based on the request, the application 304b that is the destination of the request (FIG. 4C, operation 450).

The local security agent 306b evaluates the request 330 against the locally stored policies 324b in order to determine whether to allow or deny the request 330 based on any one or more of the following, in any combination: the identity of the destination application 304b, the IP address and port of the source application 304a, some or all of the contents of the request 330, and the local policy data 324b (FIG. 4C, operation 452).

The local security agent 306b determines, based on its evaluation, whether one of the local policies 324b covers the communication request 330 (FIG. 4C, operation 454). If one of the local policies 324b does cover the request, then the local security agent 306b determines whether the covering policy allows or denies the request (FIG. 4C, operation 456). If the covering policy allows the request, then the local security agent 306b determines whether the covering policy is current, such as in any of the ways disclosed herein in connection with FIG. 2C (FIG. 4C, operation 458).

If the covering policy is current, then the local security agent 306b sets its security mode to optimistic mode (FIG. 4C, operation 466); otherwise, the local security agent 306b sets its current security mode to pessimistic security mode (FIG. 4C, operation 464). If the covering policy allows the request 330, then the local security agent 306b allows the request 330 (FIG. 4C, operation 472), regardless of whether the local policy is current.

If, in operation 472 of FIG. 4C, the local security agent 306a decides to allow the communication request 330, then, in general, the local security agent 306b allows the communication request 330 to be provided to the destination application. In other words, the local security agent 306b may unblock the communication request 330 so that it may be received by the destination application 304b.

If, in operation 454, the local security agent 306b determines that none of the local policies 324b covers the request 330, or, in operation 456, the local security agent 306b determines that the covering policy denies the request 330, then the local security agent 306b determines whether its current security mode is blocking security mode (FIG. 4C, operation 460). Furthermore, note that the local policies 324b may include a policy which specifically indicates the action to be performed if none of the local policies 324b covers the request. If the local policies 324b include such a policy, then the local security agent 306b may perform the action specified by that policy if the local security agent 306b determines that none of the local policies 324b covers the request.

If the local security agent 306b's current security mode is blocking security mode, then the local security agent 306b waits until both the client certification exchange is completed and until the information from the certificate has been used to check with respect to the relevant set of policies whether to allow or deny the communication (FIG. 4C, operation 462). If the local security agent 306b determines that the request should be allowed, then the local security agent 306b allows the connection request 330 (FIG. 4C, operation 272); otherwise, the local security agent 306a denies the connection request 330 (FIG. 4C, operation 468). The local security agent 306b also denies the connection request 330 (FIG. 4C, operation 468) if, in operation 460, the local security agent 306b determines that its current security mode is not blocking mode.

The net effect of the method 400 shown in FIGS. 4A-4C is that:

the source local security agent 306a makes an informed decision about whether to allow or deny the connection request based on the information available to it at the time; and if the connection is allowed, the destination local security agent 306b makes an informed decision about whether to allow or deny the request based on the information available at the time.

One of the advantages of embodiments of the invention shown in FIGS. 3 and 4A-4C is that they may be used to enable the network policies 318 to be enforced in a distributed manner by the local security agents 306a-b, without the use of a centralized backend, such as the remote system 312.

One of the advantages of embodiments of the present invention is that they may be used to protect against policy violations without requiring alterations to the source application 104a, the destination application 104b, or the network traffic between them (e.g., the communication request 130). This ability simplifies the installation, configuration, and maintenance of the system 100 greatly in comparison to systems which require applications and/or network traffic to be modified in order to detect policy violations.

Another advantage of embodiments of the present invention is that they have visibility into the network-related information of both the source and destination sides of a network communication, thereby enabling network security policies to be validated based on such information from both sides. This provides significant advantages over prior art systems, which use only information from the source or the destination, and which therefore lack, for example, information about the identity of the application executing on the other side of the communication. Access to information from both sides of network communications enables embodiments of the present invention to identify and prevent violations of network security policies which cannot be identified accurately using prior art techniques that rely solely on information from one side of the communication.

Network Application Security Policy Generation

Embodiments of the present invention generate network communication policies by applying machine learning to existing network communications, namely the policies 118, 124a, 124b. The resulting policies may be used to validate communication between applications (or services) over a network. This is merely an example, however, and not a limitation of embodiments of the present invention. Policies generated using embodiments of the present invention may be enforced in any way, including ways other than those disclosed in the "Network Application Security Policy Enforcement" patent application.

Validation of policies generated by embodiments of the present invention enables an imposter application to be detected and prevented from communicating even if the imposter application communicates, or attempts to communicate, using the same name and communication content as a permitted application. This result may be achieved by validating applications using application fingerprints that can distinguish permitted applications from prohibited applications based on features other than mere application name and communication content. Additional details and embodiments of the present invention will be described in more detail below.

Figure 6:
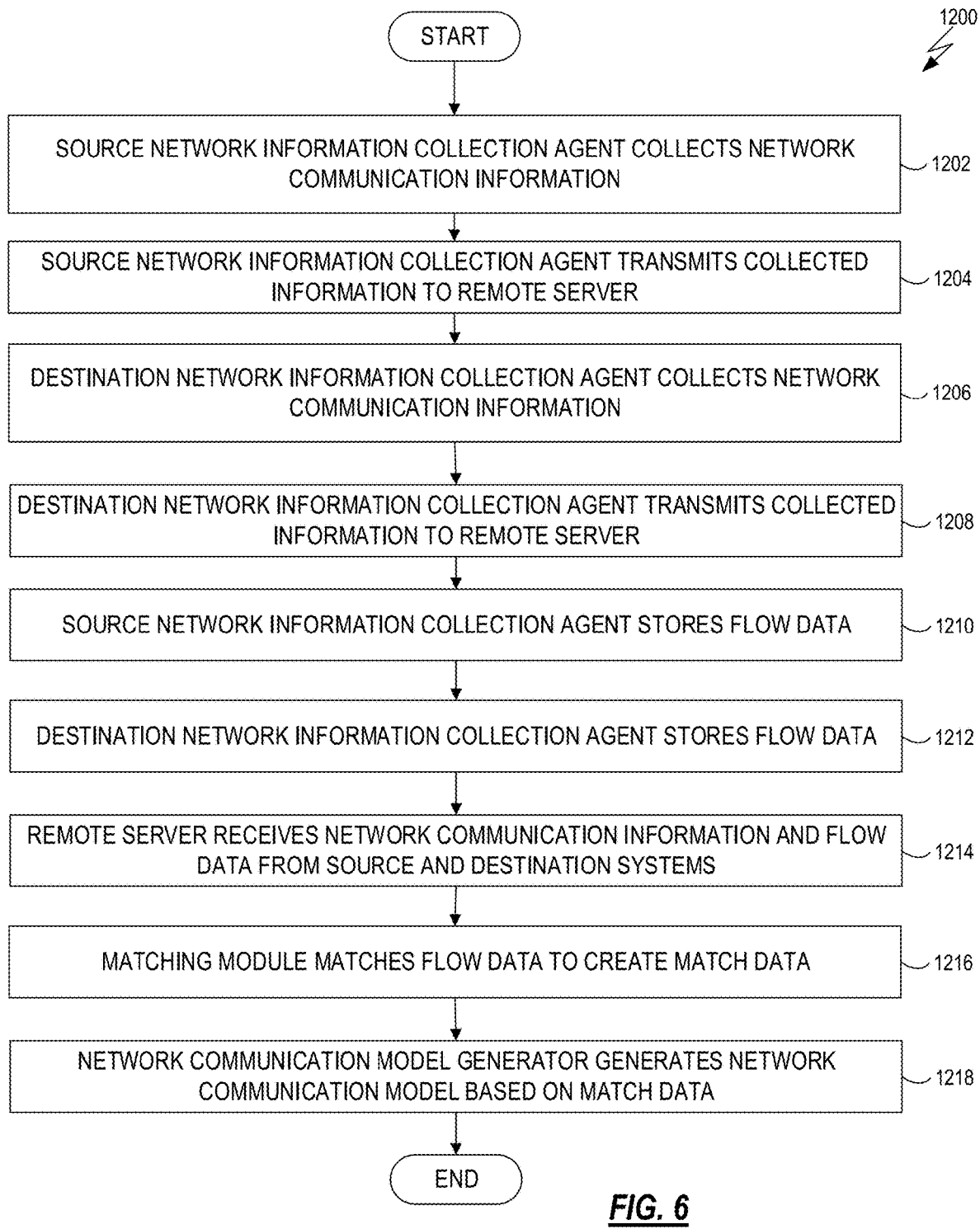
FIG. 6 is a flowchart of a method performed by the system of FIG. 5 according to one embodiment of the present invention.

Referring to FIG. 5, a dataflow diagram is shown of a system 1000 for generating network application security policies according to one embodiment of the present invention. Referring to FIG. 6, a flowchart is shown of a method 1200 performed by the system 1100 according to one embodiment of the present invention. Of note, the system 1000 can be the same as the system 100 used for policy enforcement as well as a different system, or different components in a same system.

In general, the system 1100 and method 1200 collect information about which applications are communicating with each other in the system 1100. Such information includes, for example, identifying information about each such application (such as its name, the machine on which it executes, its network address, and the port on which it communicates). The system 1100 and method 1200 apply machine learning to such gathered information to create a model 1104 based on the collected network communication information. The model 1104 is generated to have at least two properties, which may be at least in part in conflict with each other: (1) accurately reflect existing network communications, and (2) be in the form of human-readable rules. The model 1104 may have each such property to a greater or lesser extent.

As will be described in more detail below, the system 1100 and method 1200 may generate the model 1104 even in the absence of training data in which particular network communications are labeled as "healthy" (i.e., desired to be permitted) or "unhealthy" (i.e., desired to be blocked). One benefit of embodiments of the present invention is that they may generate the model 1104 in absence of such training data, while striking a balance between being permissive enough to permit healthy but previously unseen network communications (e.g., network communications that have properties different than the communications that were used to generate the model 1104) and being restrictive enough to block previously-unseen and unhealthy network communications.

The system 1100 may include any number of individual systems from which the system 1100 may collect network communication information. For ease of illustration and explanation, only two systems, a source system 1102a and a destination system 1102b, are shown in FIG. 5. In practice, however, the system 1100 may include hundreds, thousands, or more such systems, from which the system 1100 may collect network communication information using the techniques disclosed herein.

A "system," as that term is used herein (e.g., the source system 102a and/or destination system 102b), may be any device and/or software application that is addressable over an Internet Protocol (IP) network. For example, each of the source system 102a and the destination system 102b may be any type of computing device, such as a server computer, desktop computer, laptop computer, tablet computer, smartphone, or wearable computer. The source system 102a and the destination system 102b may have the same or different characteristics. For example, the source system 102a may be a smartphone and the destination system 102b may be a server computer. A system (such as the source system 102a and/or destination system 102b) may include one or more other systems, and/or be included within another system. As merely one example, a system may include a plurality of virtual machines, one of which may include the source system 102a and/or destination system 102b.

The source system 102a and destination system 102b are labeled as such in FIG. 5 merely to illustrate a use case in which the source system 102a initiates communication with the destination system 102b. Also, the systems 102a, 102b can be the same as in FIG. 1. In practice, the source system 102a may initiate one communication with the destination system 102b and thereby act as the source for that communication, and the destination system 102b may initiate another communication with the source system 102a and thereby act as the source for that communication. As these examples illustrate, each of the source system 102a and the destination system 102b may engage in multiple communications with each other and with other systems within the system 1100, and may act as either the source or destination in those communications. The system 1100 may use the techniques disclosed herein to collect network communication information from any or all such systems.

The source system 102a includes a source application 1104a and the destination system 102b includes a destination application 1104b. Each of these applications 1104a and 1104b may be any kind of application, as that term is used herein. The source application 1104a and the destination application 1104b may have the same or different characteristics. For example, the source application 1104a and destination application 1104b may both be the same type of application or even be instances of the same application. As another example, the source application 1104a may be a client application and the destination application 1104b may be a server application, or vice versa.

Before describing the system 1100 and method 1200 in more detail, certain terms will be defined. The system 1100 may collect information about applications that communicate with each other over a network within the system 1100. The system 1100 may, for example, collect such network communication information using a network information collection agent executing on each of one or more systems within the system 1100. For example, in FIG. 5, source system 102a includes a network information collection agent 1106a and destination system 102b includes a network information collection agent 1106b. The agents 1106a-b may perform any of the functions disclosed herein for collecting network communication information. Also, the agents 1106a, 1106b may be the same a the local security agents 106a, 106b.

For example, the network information collection agent 1106a on the source system 102a may collect, for each network communication (e.g., connection request, message, packet) transmitted or received by the source system 1102a, any one or more of the following units of information (FIG. 6, operation 1202):

the local IP address and port of the communication
the remote IP address and port of the communication
the host (machine) name of the system on which the agent 1106a is executing (e.g., the source system 102a)
a unique identifier of the agent 106a (also referred to herein as a "source agent ID" or "local agent ID")
an identifier (e.g., name) of the application transmitting or receiving the communication on the system on which the agent 1106a is executing (also referred to herein as a "source application ID" or "local application ID")
a unique identifier of the agent 1106b (also referred to herein as a "destination agent ID" or "remote agent ID")
an identifier (e.g., name) of the application transmitting or receiving the communication on the system on which the agent 1106*b* is executing (also referred to herein as a "destination application ID" or "remote application ID") an identifier (e.g., username) of the user executing the application on the system on which the agent 1106*a* is executing an identifier (e.g., username) of the user executing the application on the system on which the agent 1106*b* is executing The network information collection agent 1106*a* on the source system 102*a* may transmit a message 1112*a* to a remote server 1110, containing some or all of the information collected above, and/or information derived therefrom (FIG. 6, operation 1204). The network information collection agent 1106*a* may collect such information for any number of communications (e.g., at least one million, one hundred million, one billion, one hundred billion, or one trillion communications) transmitted and/or received by one or more applications (e.g., source application 1108*a*) executing on the source system 102*a*, and transmit any number of instances of message 1112*a* (e.g., at least one million, one hundred million, one billion, one hundred billion, or one hundred billion instances of message 1112*a*) containing such collected information to the remote server 1110 over time (e.g., periodically). In other words, the system 1100 may repeat operations 1202 and 1204 for any number of communications at the source system 102*a* over time to collect and transmit network communication information for such communications. Also, the remote server 1100 may be the same as the remote server 1102.

The description above of the functions performed by the network information collection agent 1106*a* on the source system 102*a* apply equally to a network information collection agent 1106*b* on the destination system 102*b*, which may collect network communication information for any number of communications (e.g., at least one million, one hundred million, one billion, one hundred billion, or one trillion communications) transmitted and/or received by one or more applications (e.g., destination application 1108*b*) executing on the destination system 102*b* using any of the techniques disclosed herein (FIG. 6, operation 1206), and transmit any number of instances of message 1112*b* (e.g., at least one million, one hundred million, one billion, one hundred billion, or one trillion instances of message 1112*a*) containing such collected information to the remote server 1110 over time (e.g., periodically) (FIG. 6, operation 1208). In other words, the system 1100 may repeat operations 1206 and 1208 for any number of communications at the destination system 102*b* over time to collect and transmit network communication information for such communications.

As the system 1100 gathers network communication information (e.g., by using the network information collection agents 1106*a-b* in the manner disclosed above), the system 1100 may store the gathered information. The set of information that the system 1100 collects in connection with a particular executing application is referred to herein as a "flow." The flow for any particular application may contain information that was collected from one or more communications transmitted and/or received by that application. The system 1100 may combine multiple sequential flows between an application X and an application Y into a single flow (possibly with an associated duration). However, communication between application X and another application Z will be in a separate flow, and flows between X and Z, if there is more than one, will be combined separately from flows between X and Y. An example of a flow that may be generated as the result of collecting network communication information for a particular application (e.g., source application 1108*a*) is the following: (1) timestamp: 1481364002.234234; (2) id: 353530941; (3) local_address: 149.125.48.120; (4) local_port: 64592; (5) lclass: private; (6) remote_address: 149.125.48.139; (7) remote_port: 62968; (8) rclass: private; (9) hostId: 144; (10) user: USER1; (11) exe: /usr/bin/java; (12) name: java; (13) cmd-lineId: 9; (14) duration: 0.0.

As the network information collection agent 1106*a* on the source system 102*a* gathers network communication information from network communications sent and received by applications executing on the source system 102*a* (e.g., source application 1108*a*), the network information collection agent 1106*a* may store such information in the form of flow data 1114*a* on the source system 102*a* (FIG. 6, operation 1210). The flow data 1114*a* may include data representing a flow for each of one or more applications executing on the source system 102*a*. For example, the flow data 1114*a* may include flow data representing a flow for the source application 1108*a*, where the network information collection agent generated that flow data based on network communication information collected from network communications transmitted and/or received by the source application 1108*a*. Instances of the message 1112*a* transmitted by the network information collection agent 1106*a* to the remote server 1110 may include some or all of the flow data 1114*a* and/or data derived therefrom.

Similarly, the network information collection agent 1106*b* on the destination system 1102*b* may generate flow data 1114*b* representing a flow for each of one or more applications executing on the destination system 102*b* (e.g., destination application 1108*b*), using any of the techniques disclosed herein in connection with the generation of the flow data 1114*a* by the network information collection agent 1106*a* (FIG. 6, operation 1212). Instances of the message 1112*b* transmitted by the network information collection agent 1106*b* to the remote server 1110 may include some or all of the flow data 1114*b* and/or data derived therefrom.

The term "flow object," as used herein, refers to a subset of flow data that corresponds to a particular application. For example, one or more flow objects within the flow data 1114*a* may correspond to the source application 1108*a*, and one or more flow objects within the flow data 1114*b* may correspond to the destination application 1108*b*. A flow object which corresponds to a particular application may, for example, contain data specifying that the source application 1108*a* is the source application of the flow represented by the flow object. As another example, a flow object which corresponds to a particular application may, for example, contain data specifying that the destination application 1108*b* is the destination application of the flow represented by the flow object.

Now consider a flow object, within the flow data 1114*a*, corresponding to the source application 1108*a*. Assume that this flow object represents the source application 1108*a*'s side of communications between the source application 1108*a* and the destination application 1108*b*. There is, therefore, also a flow object, within the flow data 1114*b*, corresponding to the destination application 1108*b*'s side of the communications between the source application 1108*a* and the destination application 1108*b*. Assume that the network information collection agent 1106*a* on the source system 102*a* transmits messages 1121*a* containing the flow object representing the source application 1108*a*'s side of its communications with the destination application 1108*b*, and that the network information collection agent 1106*b* on the destination system 102*b* transmits messages 1112*b* contain the flow object representing the destination application 1108b's side of its communications with the source application 1108a. As a result, the remote server 1110 receives, and may store, information about both the flow object corresponding to the source application 1108a and the flow object corresponding to the destination application 1108b (FIG. 6, operation) 214).

These two flow objects, which correspond to the two ends of an application-to-application communication (i.e. between the source application 108a and the destination application 1108b), may match up or correlate with each other in a variety of ways. For example, the local IP address and port of the flow object corresponding to the source application 1108a is the same as the remote IP address and port, respectively, of the flow object corresponding to the destination application 1108b, and vice versa. In other words, the flow object corresponding to the source application 1108a may contain data specifying a particular remote IP address and port, and the flow object corresponding to the destination application 1108b may contain data specifying the same remote IP address and port as the flow object corresponding to the source application 1108a. Various other data within these two flow objects may match up with each other as well.

A matching module 1116 in the remote server 1110 may identify flow objects that correspond to the two ends of an application-to-application communication, and then combine some or all of the data from the two flow objects into a combined data structure that is referred to herein as a "match object," which represents what is referred to herein as a "match" (FIG. 6, operation 1216). A "match," in other words, represents the two corresponding flows at opposite (i.e., source and destination) ends of an application-to-application communication.

More generally, the matching module 1116 may receive collected network information from a variety of systems within the system 1100, such as by receiving network information messages 1112a from the source system 102a and network information messages 1112b from the destination system 102b. As described above, these messages 1112a-b may contain flow data representing information about flows in the source system 102a and destination system 102b, respectively. The matching module 1116 may then analyze the received flow data to identify pairs of flow objects that represent opposite ends of application-to-application communications. For each such identified pair of flow objects, the matching module 1116 may generate a match object representing the match corresponding to the pair of flow objects. Such a match object may, for example, contain the combined data from the pair of flow objects.

The matching module 1116 may impose one or more additional constraints on pairs of flow objects in order to conclude that those flow objects represent a match. For example, the matching module 1116 may require that the transmission time of a source flow object (e.g., in the source flow data 1114a) and the receipt time of a destination flow object (e.g., in the destination flow data 1114b) differ from each other by no more than some maximum amount of time (e.g., 1 second) in order to consider those two flow objects to represent a match. If the difference in time is less than the maximum permitted amount of time, then the matching module 1116 may treat the two flow objects as representing a match; otherwise, the matching module 1116 may not treat the two flow objects as representing a match, even if they otherwise satisfy the criteria for a match (e.g., matching IP addresses).

The system 1100 also includes a network communication model generator 1120, which receives the match data 1118 as input and generates the network communication model 1104 based on the match data 1118 (FIG. 6, operation 1218). Because the matches represent flows, which in turn represent actual communications within the network, the network communication model generator 1120 generates the network communication model 1104 based on actual communications within the network.

As mentioned above, the network communication model generator 1120 may generate the network communication model 1104 with the following constraints:

(1) The rules in the model 1104 should accurately reflect the actual observed network communications, as represented by the match data 1118.

(2) The match data 1118 may be the sole source of the data that the network communication model generator 1120 uses to generate the network communication model 1104, and the match data 1118 may not contain any labels or other a priori information about which communications represented by the match data 1118 are healthy or unhealthy. The network communication model generator 1120 may, therefore, learn which observed communications are healthy and which are unhealthy without any such a priori information. This is an example of an "unsupervised" learning problem.

(3) The resulting rules in the network communication model 1104 should allow for natural generalizations of the observed network communications represented by the match data 1118, but not allow novel applications to communicate on the network without constraint. The rules, in other words, should minimize the number of misses (i.e., unhealthy communications which the model 1104 does not identify as unhealthy), even though the match data 1118 may represent few, if any, unhealthy communications and any unhealthy communications which are represented by the match data 1118 may not be labeled as such.

(4) The model 1104 should be in a form that humans can read, understand, and modify, even if doing so requires significant dedication and attention. Most existing machine learning algorithms are not adequate to produce rules which satisfy this constraint, because they tend to create complex, probabilistic outputs that people—even experts—find daunting even to understand, much less to modify.

(5) The match data 1118 may contain billions of matches, resulting from months of matches collected from a medium-to-large corporate network containing thousands of systems. The network communication model generator 1120, therefore, should be capable of processing such "big data" to produce the network communication model 1104. It may not, for example, be possible to load all of the match data 1118 into RAM on a single computer. As a result, it may be necessary to use one or both of the following:

a. Algorithms that process the match data 1118 in a distributed fashion, such as MapReduce.

b. Algorithms that process data in a streaming fashion, by using a processor to sequentially read the data and then to update the model 1104 and then forget (e.g., delete) the data that it has processed.

Not all embodiments of the present invention need satisfy, or even attempt to satisfy, all of the constraints listed above. Certain embodiments of the present invention may, for example, only even attempt to satisfy fewer than all (e.g., two, three, or four) of the constraints listed above. Regardless of the number of constraints that a particular embodiment of the present invention attempts to satisfy, the embodiment may or may not satisfy all such constraints in its generation of the resulting model 1104, and may satisfy different constraints to greater or lesser degrees. For example, the model 1104 that results from some embodiments of the present invention may be easily understandable and modifiable by a human, while the model 1104 that results from other embodiments of the present invention may be difficult for a human to understand and modify.

The resulting model 1104 may, for example, be or contain a set of rules, each of which may be or contain a set of feature-value pairs. A rule within the model 1104 may, for example, contain feature-value pairs of the kind described above in connection with an example flow (e.g., timestamp: 1481364002.234234; id: 353530941). The term "accept" is used herein in connection with a rule R and a match M as follows: a rule R "accepts" a match M if for each feature-value pair (F, V) in rule R, match M also contains the feature F with the value V. As a result, rule R will accept match M if the set of feature-value pairs in rule R is a subset of the set of feature-value pairs in match M. Furthermore, if at least one rule in the model 1104 accepts match M, then the match is accepted by the set of rules.

Examples of various techniques that the network communication model generator 1120 may use to generate the network communication model 1104 will now be described. These particular techniques are merely examples and do not constitute limitations of the present invention.

Figure 7:
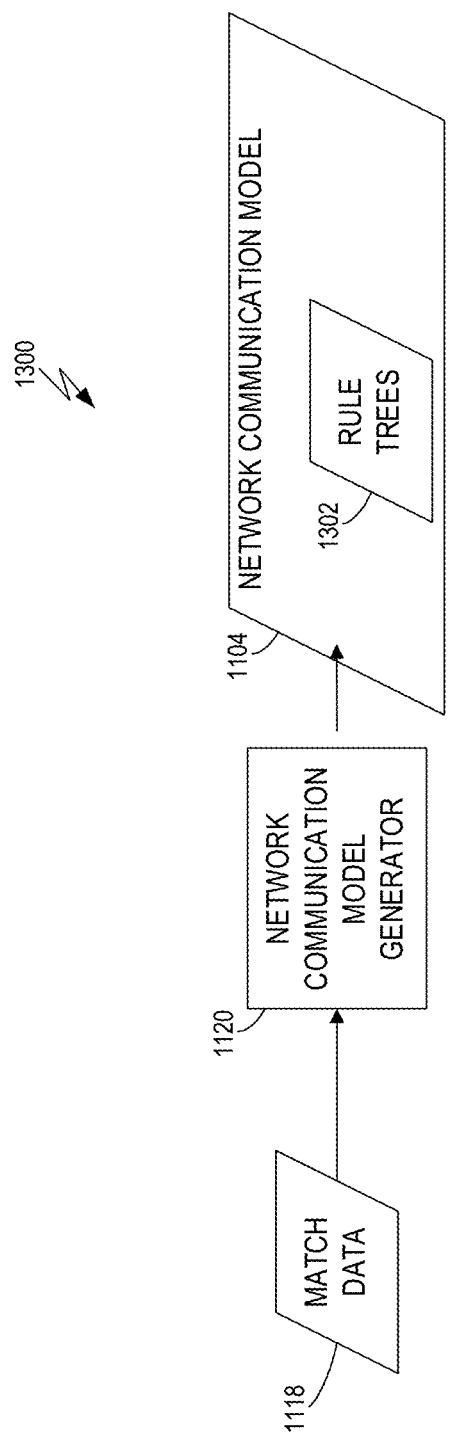
FIG. 7 is a dataflow diagram of a system for using machine learning to generate a network communication model using an unsupervised decision tree according to one embodiment of the present invention.
Figure 8:
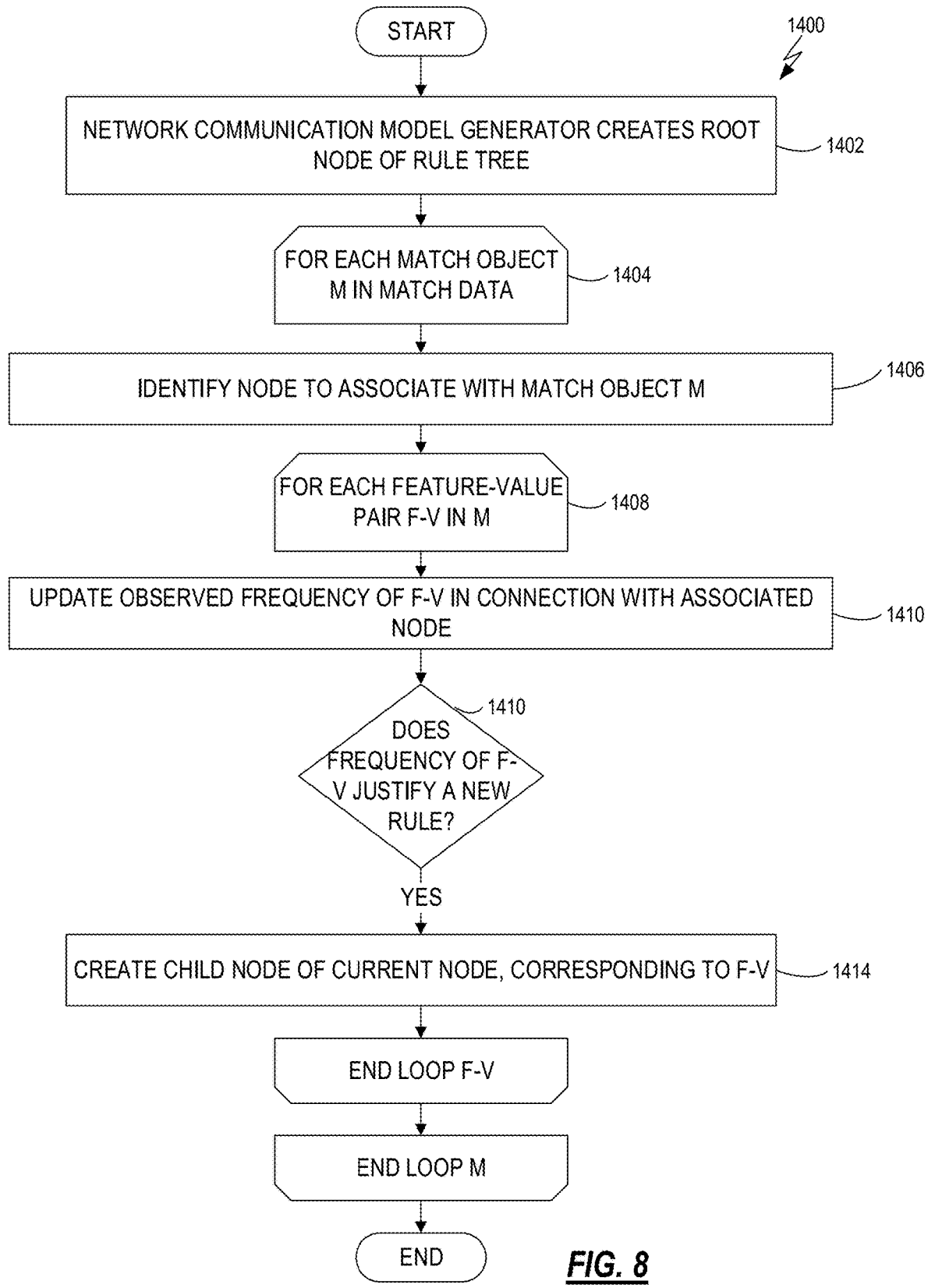
FIG. 8 is a flowchart of a method performed by the system of FIG. 7 according to one embodiment of the present invention.

Referring to FIG. 7, a dataflow diagram is shown of a system 1300 for using what is referred to herein as an "unsupervised decision tree" to generate the network communication model 1104 according to one embodiment of the present invention. Referring to FIG. 8, a flowchart is shown of a method 1400 performed by the system 1300 of FIG. 7 according to one embodiment of the present invention. In general, in the unsupervised decision tree embodiment, the network communication model generator 1120 makes multiple passes over the match data 1118 and "grows" rule trees 1302 within the network communication model 1104 when enough evidence has been discovered to justify each such rule tree. When the model 1104 becomes accurate enough (e.g., as decided by a user of the system 1300), the network communication model generator 1120 terminates and returns the existing rule trees 1302 as the network communication model 1104. The network communication model 1104 may then be used to enforce the rules, represented by the rule trees 1302, on network communications, such as by using the techniques disclosed herein.

As described above, the match data 1118 may be very large, e.g., billions of matches. The system 1300 and method 1400 may be applied to such a large set of data, which may effectively be treated as if it were infinite in size. In other words, there is no limit to the size of the match data 1118 to which the system 1300 and method 1400 may be applied. If the match data 1118 contains a finite number of match objects, then the network communication model generator 1120 may make one or more passes over the match data 1118. The network communication model generator 1120 may perform the method 1400 of FIG. 8 to all of the match data 1118 as a whole, or may split the match data 1118 into multiple subsets (bins), and apply the method 1400 of FIG. 8 to each such bin, possibly in parallel, to create a plurality of unsupervised decision trees. For ease of illustration and explanation, the system 1300 and method 1400 will be described as being applied to the entire set of match data 1118 as a single data stream.

The following description will describe the match data 1118 as a stream of match objects M, which are processed sequentially by the network communication model generator 1120. Recall that each match object M represents a match containing one or more feature-value pairs. Note that, in general, each such match may contain any kind of data, such as integers, floating point values, strings, or more complex data structures. All that is required is that the network communication model generator 1120 be capable of determining whether any two feature-value pairs are equal to each other.

The network communication model generator 1120 begins by creating a root node within the rule trees 1302 (FIG. 8, operation 402). This root node does not correspond to any particular feature-value pair, and may be represented textually as { }. The purpose of the root node is to collect statistics on the feature-value pairs that are observed in the match data 1118.

The network communication model generator 1120 sequentially examines each match object M in the match data 1118 (FIG. 8, operation 1404). The network communication model generator 1120 selects a node in the rule trees 1302 to associate with match object M (FIG. 8, operation 1406). Because, at this point in the current example, the rule trees 1302 only contain the root node, match object M is associated with the root node in operation 1406. More details will be provided below about how to associate a match object with a node once the rule trees 1302 contain additional nodes. The network communication model generator 1120 updates, for each feature-value pair that is observed in the match object M (FIG. 8, operation 1408), a count (frequency) of the number of times that feature-value pair has been observed in the match data 1118 (FIG. 8, operation 1410). This frequency data is stored in association with the root node because no other nodes have yet been created in the tree. As will be described in more detail below, once additional nodes have been created in the tree, the matching module 1116 determines which node's associated statistics to update as additional frequency-value pairs are observed in the match data 1118.

For example, the first time the network communication model generator 1120 observes a particular feature-value pair in the match data 1118, the network communication model generator 1120 may associate a frequency counter for that frequency-value pair with the root node and initialize that frequency counter to one; the next time the network communication model generator 1120 observes the same feature-value pair in the match data 1118, the network communication model generator 1120 may increment the frequency counter for that feature-value pair; and so on. The network communication model generator 1120 may store, within the root node, for each feature-value pair that has been observed in the match data 1118: (1) an identifier of the feature-value pair (e.g., the feature and value themselves); and (2) the frequency counter for that feature-value pair, including the current value of the observed frequency of that feature-value pair.

As the network communication model generator 1120 updates the feature-value frequencies as described above, the network communication model generator 1120 determines, for each such feature-value frequency, whether the value of that frequency represents sufficient evidence to confidently hypothesize a rule for that feature-value pair (FIG. 8, operation 1412). If the network communication model generator 1120 determines that the value of the frequency for a particular feature-value pair represents sufficient evidence to confidently hypothesize a rule for that feature-value pair, then the network communication model generator 1120 creates a child node of the root node, where the child node corresponds to the particular feature-value pair (FIG. 8, operation 1414). In the description herein, we refer to nodes by the set of feature-value pairs that lead to them. In this example, the root node is referred to as { }, and if the feature-value pair that led to the creation of the first child node is F1:V1, then we refer to the first child node herein as {F1:V1}. The network communication model generator 1120 may store, within this first child node: (1) an identifier of the feature-value pair F1:V1, and (2) a frequency counter for the feature-value pair F1:V1, including the current value of the observed frequency of that feature-value pair.

This simple example, in which the rule trees 1302 begin with one tree having a root node and one child node of that root node, illustrates the beginning of how a rule tree is grown by the system 1300 and method 1400. Once the rule trees 1302 contain at least one child node, then, as the network communication model generator 1120 observes additional match objects in the match data 1118, the network communication model generator 1120 must select a node with which to associate each such match object (as mentioned above in connection with operation 1406 in FIG. 8). To do this for a particular match object M, the network communication model generator 1120 may identify the branch in the rule trees 1302 that most closely matches the set of feature-value pairs in the match object M. Because each node in the rule trees 1302 is associated with a particular unique set of feature-value pairs leading to it from the root node, and each child node C of a node N is associated with a different (previously unused) feature-value pair, the network communication model generator 1120 may determine the node with which to associate a particular match object in the match data 1118 by identifying the node in the rule trees 1302 that is associated with the set of feature-value pairs that maximally matches the set of feature-value pairs in the match object. The network communication model generator 1120 may then update the frequency counters associated with the identified node based on the feature-value pairs in the match object, such as by incrementing, in the identified node, the frequency counter for each feature-value pair in the match object. It is necessary to guarantee that each path from the tree root node to every node in the tree creates a unique set of feature-value pairs. In one embodiment, this guarantee is accomplished by keeping track of the order in which each child node C (and each F-V pair) is added to each node N. Then, each match object M is compared with a node's children (and, more the feature-value pair associated with each child) in that order (i.e. in the order originally added). This eliminates ambiguities about which path to take, and guarantees that each path from the root to a node is a unique set of feature-value pairs.

As the network communication model generator 1120 examines additional match objects in the match data 1118 and updates the feature-value frequencies in the nodes of the rule trees 1302 in the manner described above, the network communication model generator 1120 may use the techniques described above to identify additional feature-value pairs having frequencies representing sufficient evidence to confidently hypothesize rules for them. For example, the network communication model generator 1120 may repeatedly determine analyze the frequency counters of all feature-value pairs associated with all nodes in the rule trees 1302 and, in response to identifying any such frequency representing sufficient evidence to confidently hypothesize a rule for the corresponding feature-value pair, the network communication model generator 1120 may create a child node of the node associated with that feature-value pair, and associate the child node with the feature-value pair.

Thereafter, when we send matches to the tree, it looks at the match to see if it contains A:B, and if it does, it sends the match to that child node without adding the match's F-V pairs to its own statistics.

Although the description above describes creating each node within the rule trees 1302 individually and immediately, this is merely an example and does not constitute a limitation of the present invention. Alternatively, for example, the network communication model generator 1120 may wait until some number of new nodes have been justified, and then create a plurality of nodes in the rule trees 1302 in a batch.

As described above, the network communication model generator 1120 may create a new child node corresponding to a particular feature-value pair only once the network communication model generator 1120 has determined that the feature-value pair's observed frequency of occurrence represents sufficient evidence to confidently hypothesize a rule for that feature-value pair. The network communication model generator 1120 may make this determination using any of a variety of standards for "sufficiency" of evidence. For example, the network communication model generator may use Hoeffding's Inequality to determine whether there is sufficient evidence to justify creation of a new child node corresponding to a particular feature-value pair. As described above, each node in the rule trees 1302 collects the probabilities for each feature-value pair that it has seen (where the probability associated with each feature-value pair may be calculated as the percentage of observed matches which contain the feature-value pair). The goal is to know when the most probably feature-value pair FV1 "deserves" to have a child node created for it in the rule trees 1302. Let 1-delta be the confidence that the network communication model generator 1120 has selected the correct feature-value pair to have a child node created for it. In other words, delta is the acceptable risk that the wrong feature-value pair is chosen to have a child node created for it. Let R be the range of the random variables (if, as in this example, the random variables are probabilities, then R=1). Let N be the number of elements seen by the current node being considered.

Now consider G=prob(FV1)−prob(FV2), which is the difference between the most probable feature-value pair FV1 and the second most probable feature-value pair FV2. According to the Hoeffding Inequality, if G>eta, then we can hypothesize the new node, with confidence 1−delta, where:

$$eta = sqrt(R\hat{\ }2 * \log(1/delta)/(2*N))$$

Note that the Hoeffding Inequality is independent of the probability distribution of the feature-value pairs.

In this way, the system 1300 and method 1400 grow the rule tree(s) 1302 until a stopping point is reached. The stopping point may, for example, be:

(1) after some number of matches have been observed by the network communication model generator 1120 in the match data 1118;

(2) after the network communication model generator 1120 has performed some number of iterations over the match data 1118;

(3) once the rule tree(s) 1302 have approximately stopped (or slowed) growing, such as by not growing by more than some number of nodes or by some percentage of size within some amount of time (e.g., number of observations by the network communication model generator 1120); or (4) once the rule tree(s) 1302 have reached at least some minimum desired size or complexity.

In response to determining that such a stopping point has been reached, the network communication model generator 1120 may return the leaves of the rule tree(s) 1302 as a set of rules for use within the network communication model 1104, where each such leaf may be associated with (and contain data representing) the set (e.g., sequence) of feature-value pairs associated with the branch of the rule tree that contains the leaf. Each such set of feature-value pairs represents a rule.

Figure 9:
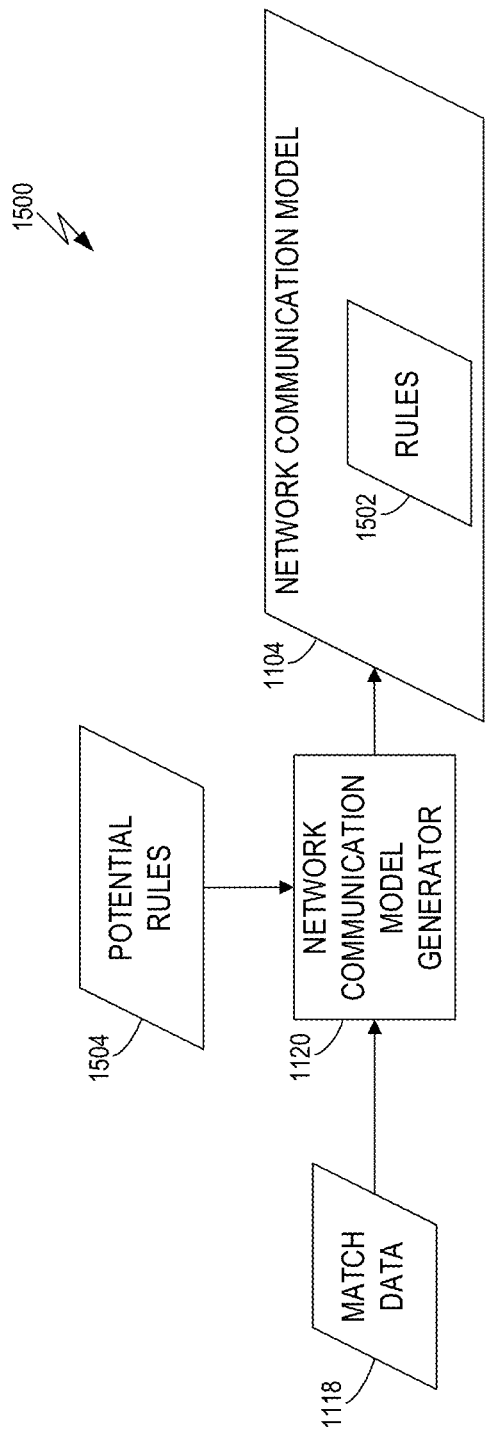
FIG. 9 is a dataflow diagram of a system for using frequent itemset discovery to generate a network communication model according to one embodiment of the present invention.
Figure 10:
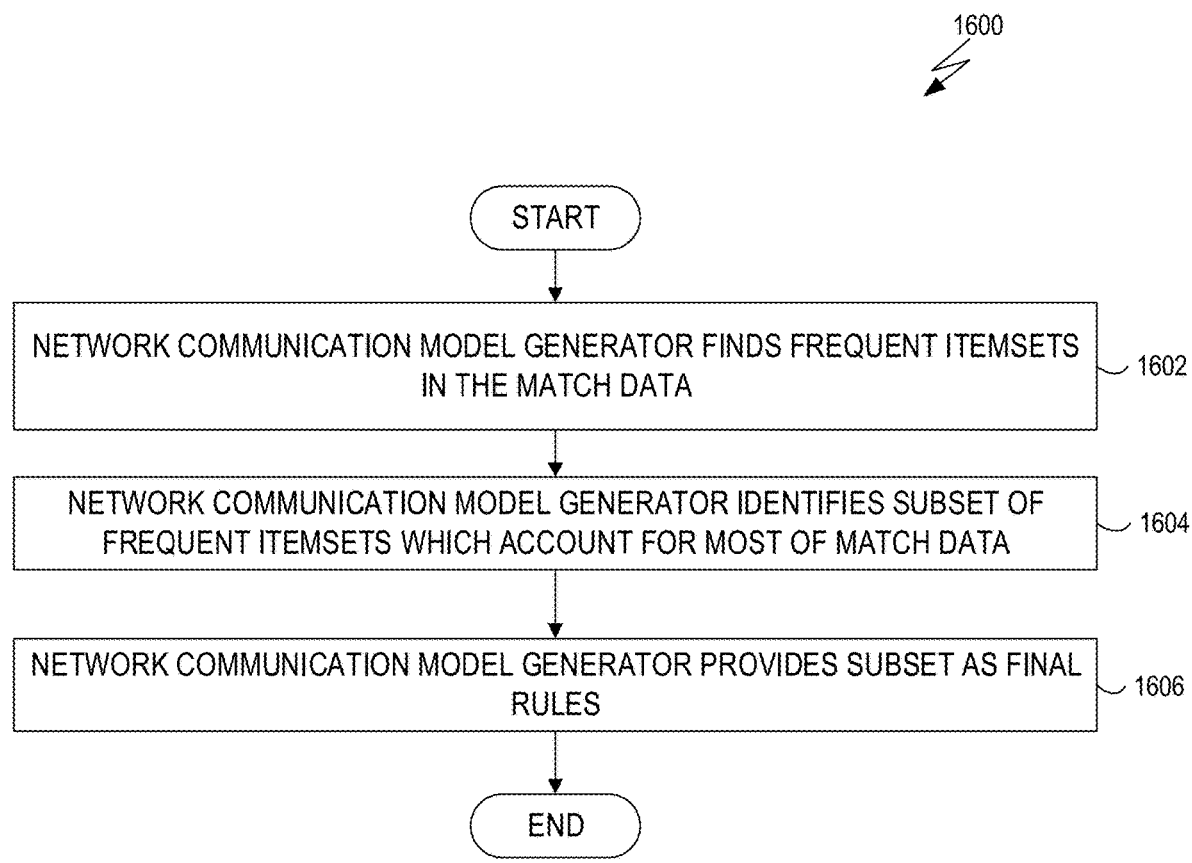
FIG. 10 is a flowchart of a method performed by the system of FIG. 9 according to one embodiment of the present invention.

Referring to FIG. 9, a dataflow diagram is shown of a system 1500 for using what is referred to herein as a "frequent itemset discovery" to generate the network communication model 1104 according to one embodiment of the present invention. Referring to FIG. 10, a flowchart is shown of a method 1600 performed by the system 1500 of FIG. 9 according to one embodiment of the present invention. In general, in the frequent itemset embodiment, the network communication model generator 1120 creates rule candidates within the network communication model 1104. These rule candidates serve as an initial candidate set of rules 1502 within the network communication model 1104. The network communication model generator 1120 then uses a greedy algorithm or an evolutionary algorithm (both of which may be implemented as MapReduce algorithms) to winnow down a set of possible rules into a smaller (possibly far smaller) set of "covering" rules. The network communication model generator 1120 terminates and returns the resulting winnowed set of rules 1502 as the network communication model 1104. The network communication model 1104 may then be used to enforce the rules 1502 on network communications, such as by using the techniques disclosed herein.

More specifically, the network communication model generator 1120 finds a set of feasible potential rules by identifying frequent itemsets among the matches in the match data 1118, where each element is a set of feature-value pairs in the form of a match represented by a match object in the match data 1118 (FIG. 10, operation 1602). The network communication model generator 1120 may perform this using, for example, the parallel FP-Growth algorithm, as described in the following paper: Li, Haoyuan and Wang, Yi and Zhang, Dong and Zhang, Ming and Chang, Edward Y. (2008) "Parallel FP-growth for Query Recommendation," Proceedings of the 2008 ACM Conference on Recommender Systems. The output of this algorithm is a list of sets of items (in this case, feature-value pairs in the form of match objects) that were observed frequently (e.g., more than some threshold number of times) in the match data 1118.

The network communication model generator 1120 may treat each such itemset to be a potential rule for use in the set of rules 1502 in the network communication model 1104. The network communication model generator then identifies a subset of this set of potential rules 1504, by identifying a much smaller subset of those potential rules which account for all or almost all of the match data (FIG. 10, operation 1604). The network communication model generator 1120 may then provide the resulting identified subset of the potential rules 1504 as a set of final rules 502 within the network communication model 1104 (FIG. 10, operation 1606). The network communication model generator 1120 may identify the subset 1502 of the potential rules 1504 in any of a variety of ways, such as any one or more of the following.

The network communication model generator 1120 may identify the final rules 1502 as a subset of the potential rules 1504 using a greedy algorithm. Using this algorithm, the network communication model generator 1120 may enter a loop over each feature-value set (i.e., match object) M. The network communication model generator 1120 may consider all of the itemsets in the potential rules 1504 as potential rules for the match object M. For the match object M, the network communication model generator may examine the itemsets in the potential rules 1504 in order, starting from the itemset(s) with maximum length and then proceeding through the itemset(s) of decreasing length until and including the itemset(s) of minimum length. If there are multiple itemsets having the same length, then the network communication model generator 1120 processes those multiple itemsets in decreasing order of observed frequency within the match data 1118 (e.g., by processing the highest-frequency itemset(s) first and proceeding in order of decreasing frequency).

In one embodiment, as the network communication model generator 1120 examines each itemset in the potential rules 1504 in the order described above, when the network communication model generator 1120 encounters the first itemset that is a subset of the match object M, the network communication model generator 1120 increments a count associated with that itemset, and stops examining itemsets in the potential rules in connection with match object M. In another embodiment, the model generator 1120 does not stop examining itemsets after encountering the first match, but instead continues to evaluate itemsets until a certain number have been found and then stops. In yet another embodiment, the model generator 1120 processes randomly selected subsets of the full itemset list with a probability proportional to the number of times that itemset was observed in the itemset finding process. In any of these embodiments, the network communication model generator 1120 may repeat the same process described above for the remaining match objects M in the match data 1118.

Once the network communication model generator 1120 has processed all of the itemsets in the potential rules 1504 in the manner described above, the network communication model generator 1120 returns the itemsets in the potential rules 1504 which have non-zero counts as the set of final rules 1502. The network communication model generator 1120 need not, however, include all non-zero count itemsets within the final set of rules 1502. The network communication model generator 1120 may, for example, exclude, from the rules 1502, one or more itemsets having small counts, such as counts falling below some particular threshold, or some number of percentage of the lowest-count itemsets in the potential rules. Because such low-count rules typically and redundantly also accept data previously accepted by other rules, pruning low-count itemsets typically removes much of the redundancy from the final rules 1502.

Figure 11:
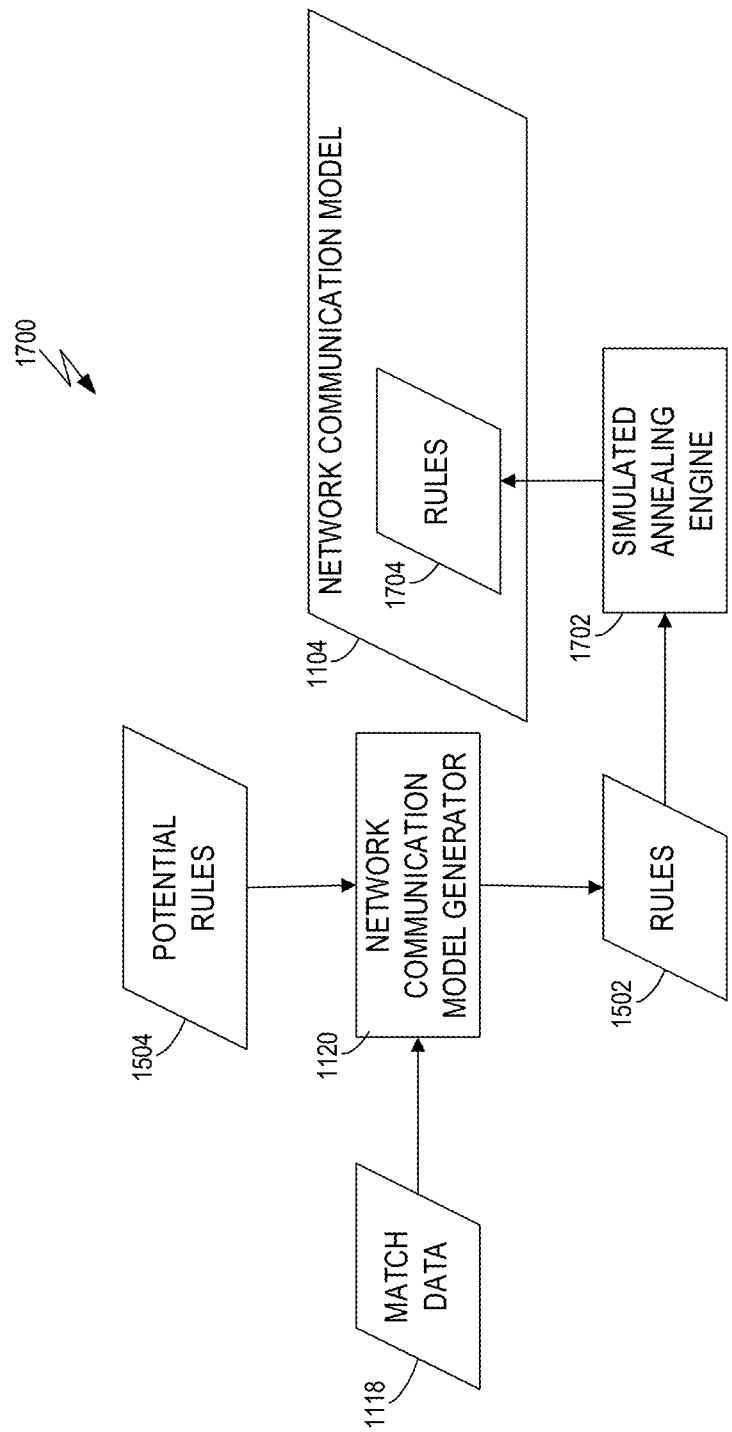
FIG. 11 is a dataflow diagram of a system for using simulated annealing to generate a network communication model according to one embodiment of the present invention.
Figure 12:
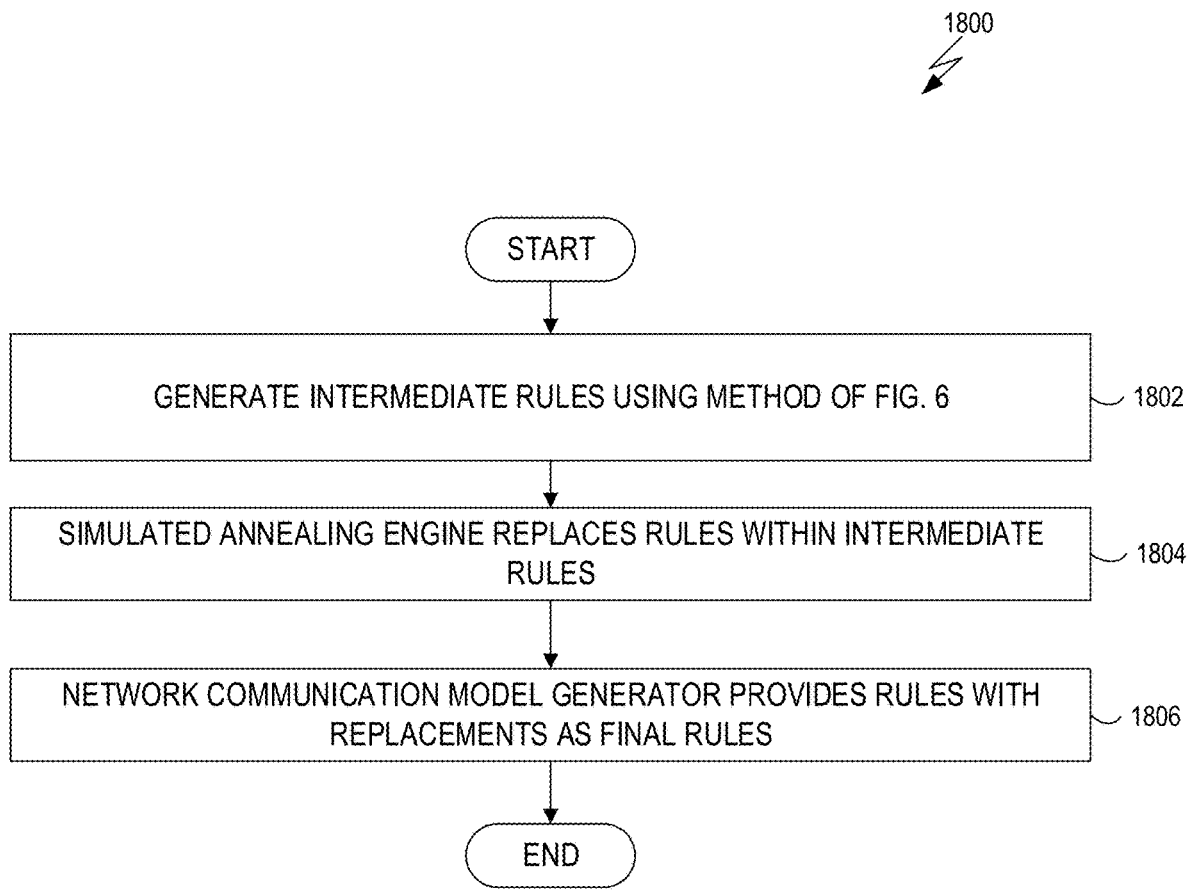
FIG. 12 is a flowchart of a method performed by the system of FIG. 11 according to one embodiment of the present invention.

In yet another embodiment of the present invention, and as illustrated by the system 1700 of FIG. 11, the network communication model generator 1120 generates the rules 1502 using the greedy algorithm approach described above (FIG. 12, operation 1802). In the system 1700 of FIG. 11, however, the rules 1502 are not treated as the final set of rules, but instead are treated as an intermediate set of rules. A simulated annealing engine 1702 within the system 1700 replaces rules within the intermediate rules 1502 (FIG. 12, operation 1804), thereby producing a final set of rules 1704 within the network communication model 1104 (FIG. 12, operation 1806). The final rules 1704 reduce redundancy without reducing accuracy, relative to the intermediate set of rules 1502.

More specifically, the simulated annealing engine 1702 may randomly select rules for replacement within the rules 1502, where the probability that the simulated annealing engine 1702 will select any particular one of the rules 1502 for replacement is related to the inverse of that rule's count. As a result, in practice, low-count rules may almost always be chosen for replacement. The probability of replacing a particular rule R may be assigned in any of a variety of ways such as by using the following formula:

prob(R)=1.0−count(R)/count(allData)

As another example, the probability of replacing a particular rule R may take the rule R's redundancy into account in addition to the count of the rule R, such as by using the following formula:

prob(R)=redundancy(R)/count(R)/NormalizationConstant

Redundancy is defined as the number of match objects a rule matches, minus the number only it matches.

Regardless of how the probability of rule R is calculated or otherwise assigned, the network communication model generator may decide whether to replace rule R with another randomly selected non-zero count rule S, with a probability that is dependent on how much better the new rule S is compared to the old rule R, where:

if count(S)>count(R)then prob(accept)=1 otherwise prob(accept)=exp(−(count(R)−count(S)))/T_i)

where T_i is a (positive) "temperature" that decreases for each successive iteration (i.e., attempt to replace rule R), so that rule replacements become less likely as iterations continue.

The suitability of a rule is related to how many of the underlying matches it "covers," and covers uniquely. This depends on all the other rules in the intermediate set of rules 1502. To evaluate this goal may require a MapReduce iteration, because we need to visit the original match data 1118 in order to recount, as described above. Since a MapReduce iteration on a large amount of data is slow, we prefer to reduce this by only re-evaluating the proposed rule set by "batching" several multiple potential rule changes and testing them together. It is also possible to estimate this MapReduce operation by creating a "sketch" of the data supported by each rule, for example by a data structure similar to a Bloom Filter, and estimating the results of the MapReduce operation more cheaply. Therefore, it may be helpful for the simulated annealing engine to "batch" multiple potential rule replacements into a single MapReduce operation.

Although a process of simulated annealing is described in connection with FIG. 11, other techniques, such as evolutionary optimization, may be applied to achieve similar results. For example, evolutionary optimization may be used to generate a population of alternative rule sets, which in term "spawn" alternative rule sets, and then to prune out "unfit" alternative rule sets, so that only the most fit rule sets survive for the next iteration.

The embodiments described above may be modified in a variety of ways. For example, as described above, the system 1100 of FIG. 5 may create sets of feature-value pairs within the rules in the network communication model 1104. Embodiments of the present invention may additionally create and store data referred to herein as "feature clusters" (or simply "clusters") within the network communication model 1104. A feature cluster corresponding to a particular feature F may, for example, be a subset of the set of values that are assigned to feature F in the match data 1118. Without loss of generality, such a feature cluster may correspond to a set of features, where the values for the features in that set are of the same type (e.g., the values for all features in the set are applications, or the values of all features in the set are hosts). As an illustrative example, and without limitation, assume that the set of application names that have been observed in network communications and reflected in the match data 1118 (that is, the values of either the "local_application_name" or the "remote_application_name" feature, both features taking applications as their values) are associated with the set of integers from 1 to N, inclusive. In this example, assume that a subset of the set of application names—such as {2, 15, 27, 41}—is selected to be a feature cluster for the application name feature, which will be referred to herein as feature cluster A.

Figure 13:
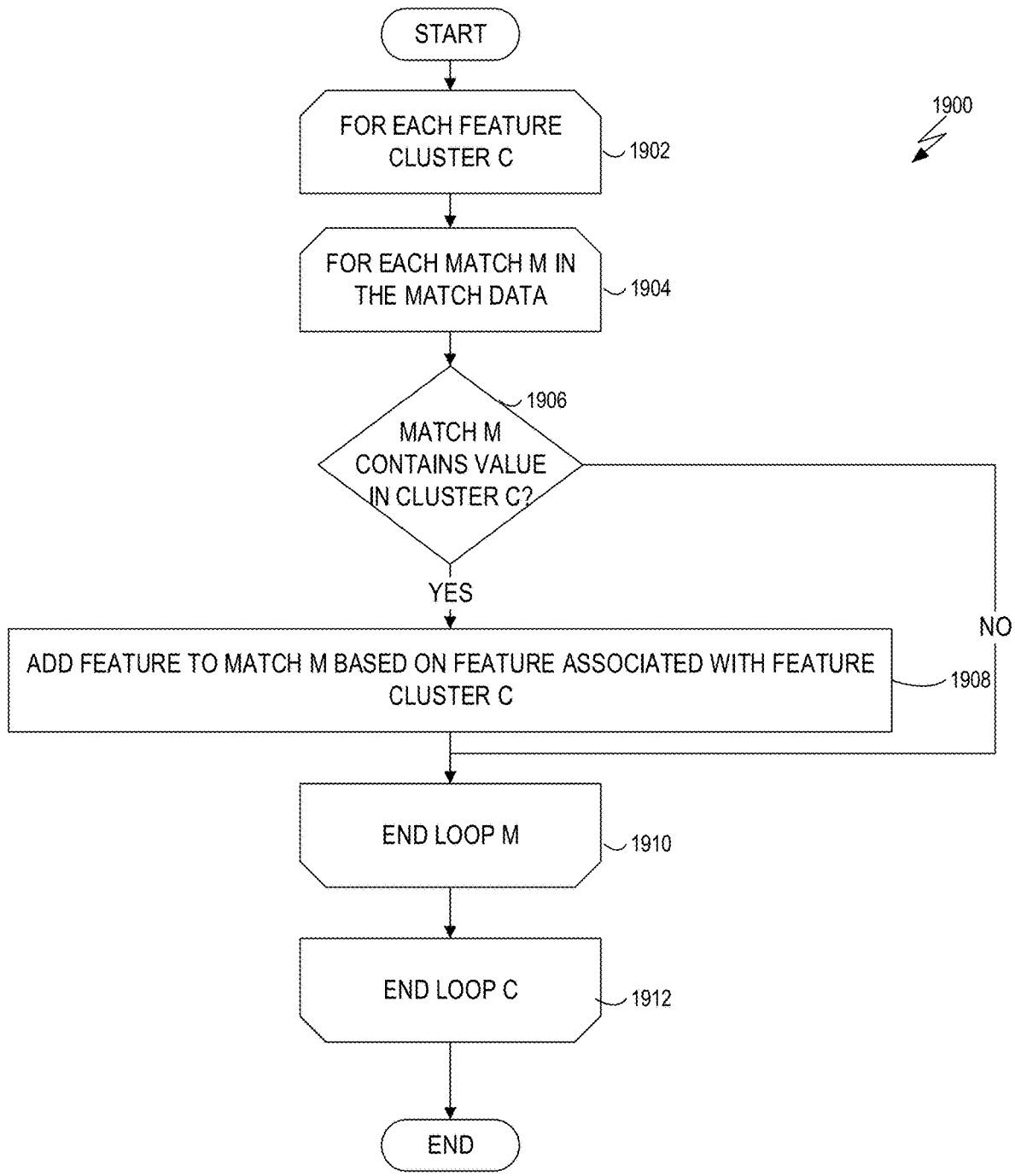
FIG. 13 is a flowchart of a method that the network communication model generator uses to update the match data based on feature clusters according to one embodiment of the present invention.

Referring to FIG. 13, a flowchart is shown of a method 1900 that the network communication model generator 1120 may use to update the match data 1118 based on feature clusters according to one embodiment of the present invention. In the description of the method 1900 of FIG. 13, the feature cluster A, above, will be used as an example, but it should be understood that the method 1900 of FIG. 13 may be used in connection with any feature cluster(s). As the network communication model generator 1120 creates the network communication model 1104, then for each feature cluster C (FIG. 13, operation 1902) and for each match M in the match data 1118 (FIG. 13, operation 1904), the network communication model generator 1120 may determine whether match M contains an application name (e.g., a value of the "local_application_name" feature or the "remote_application_name" feature) which is in feature cluster C (e.g., feature cluster A, above) (FIG. 13, operation 1906). If there is such a match M, then the network communication model generator 1120 adds, to match M, the feature that corresponds to feature cluster C, with the same value that was found in operation 1906 in feature cluster C (FIG. 13, operation 1908). For example, in the case of feature cluster A, above, an application name cluster feature (e.g., a "local_application_name_cluster" feature or a "remote_application_name_cluster" feature) may be added to match M. For example, assume that match M contains the following features and corresponding values:

local_app_name: 7
    remote_app_name: 41
    local_host_name: 34
    remote_host_name: 27

Now assume that the network communication model generator 1120 identifies a match M in the match data 1118 having a value V of feature F, where feature cluster A corresponds to feature F (possibly among other features) and where feature cluster A includes value V. In response, the network communication model generator 1120 may add an application name cluster feature with a value of "A" (the label or other identifier of feature cluster A) to match M, resulting in the following modified match M:

local_app_name: 7
    remote_app_name: 41
    remote_app_name_cluster: A
    local_host_name: 34
    remote_host_name: 27

The result is that the match M now contains data identifying a feature cluster (namely, application name feature cluster A) which contains a value (namely, 41) of a feature (namely, the remote_app_name feature) that is in the match M. The network communication model generator 1120 may repeat this process for any number of matches (FIG. 13, operation 1910) and feature clusters (FIG. 13, operation 1912) to modify the match data 11118 as described above. This process may be performed before the network communication model generator 1120 generates the potential rules 504.

Embodiments of the present invention may create feature clusters in any of a variety of ways, such as the following two examples. One way that embodiments of the present invention may create feature clusters is to analyze communications within the network as a whole. More specifically, for each value V1 observed by the system 1100 for feature F in the system 100, the network communication model generator 1120 may create a vector representing the other values V2 that are in communication with V1. Such a vector may, for example, contain data representing a "connection strength" between V1 and V2, which may, for example, be equal to or based on the number of times that V1 and V2 are the values of the local and remote versions of the same feature, respectively. For example, "local_app_name" and "remote_app_name" are the local and remote versions of the "app_name" (application name) feature. As a particular example of this technique for creating feature clusters, consider the following match M:

local_app_name: 7
remote_app_name: 41
local_host_name: 34
remote_host_name: 27

This match indicates that the local application named "7" (V1) is in communication with the remote application named "41" (V2). Now assume that the network communication model generator 120 maintains a vector for application V1, which contains values representing a connection strength between application V1 and other applications. The network communication model generator 120 may initialize such values to zero or any other value(s).

The network communication model generator 1120 may, within the vector for V1 (the application named 7), increase the connection strength associated with the remote application named 41 (e.g., by one or some other value) because of the observation, in the above match M, that V1 and V2 are the respective values of the local and remote versions of the same feature (i.e., the app_name feature). Using the same process, the network communication model generator 1120 may, within the vector for host name 34, increase the connection strength associated with the remote host named 27 because of the observation, in the above match M, that 34 and 27 are the respective values of the local and remote versions of the host_name feature. This yields a vector, probably sparse (that is, mostly zeros), for each observed application value.

From the vectors for each application, the network communication model generator 1120 may derive a "distance" for two applications based on the similarity of their corresponding vectors. Vector similarity can be obtained in a number of ways, the most common being the "normed Euclidean distance".

The network communication model generator 1120 may then generate a feature cluster for a particular feature F (such as "app_name" or "host_name") by: (1) sorting all of the distances between the vectors for all observed values of feature F, so that the minimum distance strength is first; and (2) in the sorted order of distances, attaching pairs of values together. For example, if the sorted values of feature F are {2, 4, 5, 8, 12, 15, 20}, and there is a distance for each pair of values, then a feature cluster may be generated for feature F by first adding the pair {2, 4} (which is the pair with the minimal distance) to the feature cluster, resulting in a feature cluster of {2, 4}, and then adding the next closest pair {4, 5}, resulting in a feature cluster of {2, 4, 5}, and so on, until the desired maximum cluster size is reached or no feature values remain to be added to the cluster. If the desired maximum cluster size is reached, then a new empty feature cluster may be created and subsequent feature values may be attached to it using the same process described above, starting with the next feature in the sorted list of feature values.

A cluster is the "transitive closure" of the connections contained in the cluster. That is, if A is attached to B and B is attached to C, then {A, B, C} are in the same cluster. If then C is attached to D, then then cluster becomes {A, B, C, D}. The "Union Find" algorithm can be used to determine this efficiently, while keeping track of the value attachment process.

Embodiments of the present invention may use any of a variety of techniques to decide when to stop attaching values to the current feature cluster and then to create a new feature cluster to which values are then attached. For example, there is a risk that all feature values will be attached into a single cluster. Embodiments of the present invention may protect against this risk by determining, before attaching the next value to the current feature cluster, whether the current feature cluster satisfies the Erdos-Renyi conditions, and then stop adding nodes to the current feature cluster (and create a new current feature cluster to which nodes are added) if those conditions are satisfied.

Once the network communication model generator 1120 determines that it is no longer possible to attach values to feature clusters for the current feature, the network communication model generator 1120 stops adding nodes to feature clusters for the current feature. At that point, all of the independent transitive closures of attached values become separate feature clusters for that particular feature.

Another example of a method that embodiments of the present invention may use to generate feature clusters is to generate feature clusters after the final rules 1502 have been generated, rather than generating the feature clusters before generating the potential rules 1504. Instead, the potential rules 1504 are generated without generating feature clusters.

The network communication model generator 1120 then looks for rules, within the rules 1502, which differ from each other by only one value of one feature. For example, consider the following three rules:

local_app_name: 7
remote_app_name: 41
local_host_name: 34
remote_host_name: 27
local_app_name: 7
remote_app_name: 41
local_host_name: 34
remote_host_name: 28
local_app_name: 7
remote_app_name: 41
local_host_name: 34
remote_host_name: 29

All of these rules are the same as each other except that the value of the feature "remote_host_name" differs in each of them. The network communication model generator 1120 may determine that these three rules are the same as each other except for the differing value of the single feature "remote_host_name" and, in response to that determination, effectively collapse (combine) the three rules into a single rule by creating the following feature cluster:

local_app_name: 7
remote_app_name: 41
local_host_name: 34 remote_host_name: A hostCollection A={27, 28, 29}

After that, the new rule replaces the three rules, which are deleted when the new rule is added.

The process of creating feature clusters has several goals which may be in tension with each other: (1) a preference to add a node to an already-existing cluster rather than to create a new cluster; (2) a preference to create a new cluster rather than create a new rule; (3) a preference to have fewer clusters rather than more clusters; (4) a preference for the nodes in a cluster to be as similar to each other as possible, in the sense of "similarity" described above; and (5) a preference for clusters not to exceed a maximum size, which may, for example, be approximately equal to the natural log of the total number of items in the cluster. Embodiments of the present invention may attempt to balance these goals in any of a variety of ways, such as by approximately optimizing each of these goals as much as possible, given the constraints imposed by the other constraints (goals).

Note that the two methods described above for generating feature clusters are merely examples and are not limitations of the present inventions. These two methods may be used individually, in combination with each other, or in combination with other methods not disclosed herein.

Embodiments of the present invention may repeat the methods disclosed herein over time to add new rules within the rules 1502, based on all of the accumulated match data 1118, as more matches are added to the match data 1118. Each new generated set of rules typically will differ somewhat from previously-generated rules as a result of changes in the match data 1118 and the non-deterministic nature of the methods used to generate the rules 1502.

In practice, once a particular set of the rules 1502 has been generated and deployed, a particular user (e.g., organization) may develop and deploy policies to protect the user's critical applications based on the particular set of rules 1502. There is a benefit, therefore, to not generating additional rules within the rules 1502 which are inconsistent with the rules on which the user's deployed policies were based.

Embodiments of the present invention may train and generate subsequent sets of rules within the rules 1502 such that the subsequent rule sets are not inconsistent with existing deployed policies deployed by a customer, where such existing deployed policies were generated based on a previous version of the rules 1502, such as by using the following method.

When generating a new set of rules within the rules 1502, the network communication model generator 1120 may add the deployed customer policies as initial rules to the new rule set (i.e., before adding any automatically-generated rules to the new rule set), and mark such rules as customer-generated rules so that they will not be modified or removed from the new rule set or the rules 1502 more generally. Note that these customer-generated rules will typically account for only a small fraction of the matches in the match data 1118. This means that these accounted-for matches will have no influence on the remainder of the training, and thus will result in no learned rules. As a result, the effect of adding the customer-generated rules to the new rule set is to remove these accounted-for matches from the match data 1118.

The network communication model generator 1120 then generates new rules based on the current match data 1118 in any of the ways disclosed herein. At the end of this process, the customer-generated rules are removed from the new rules generated by the network communication model generator 1120, and then only the latter are returned as the new rules and added to the rules 1502. The effect of this is to generate and add new rules to the rules 1502 which are consistent with the customer-generated policies.

The match data 1118 may include a set pairs, each of which includes: (1) a unique data point representing a corresponding match; and (2) a count for that data point, representing the number of occurrences of the corresponding match. For example, if the match data 1118 represents matches A, B, C, D, and E as follows: [A, B, A, C, B, D, A, C, B, A, D, E, C, A], then the system 1100 may transform that match data 118 into the following: {A:5, B:3, C:3, D:2, E:1}. For example, "A:5" indicates that match A occurs 5 times in the match data 1118. Storing the match data 1118 in this form (also known as a "multiset") may enable the match data 1118 to be stored more compactly and processed more quickly than in uncompressed form. Note that the system 100 may first generate the match data 1118 in uncompressed form and then convert it to compressed (multiset) form, or generate the match data 118 directly in compressed form.

Recalling the use of frequent itemset discovery in the system 1500 and method 1600 of FIGS. 9 and 10, respectively, the system 1500 may associate, with each itemset in the potential rules 1504, the subset of unique matches (in the match data 1118) that the itemset accepts (as defined above). For example, if potential rule C accepts matches A and D but does not accept match B, C, or E, then the system 1500 may associate potential rule C with the subset {A, D} and store data representing this association. Identifying and storing records of such associations may be used to accelerate the calculations performed by the system 1500 as follows. Note that if feature clusters have already been created using any of the techniques disclosed herein, then such feature clusters are already within the potential rules 1504.

The network communication model generator 1120 may select rules, from the potential rules 1504, for inclusion in the final rules 1502 in any of a variety of ways. The match data 1118 may be understood as a multi-set and the potential rules 1504 as subsets of that multi-set. The problem of selecting rules from the potential rules 1504 for inclusion in the rules 1502 may then be seen as an instance of the "weighted set cover" problem. Although it is intractable to find the optimal solution to this problem, embodiments of the present invention may use any of a variety of efficient approximate solutions to this problem to select rules from the potential rules 1504 to include in the rules 1502.

For example, the network communication model generator 1120 may use a "greedy" approach to select rules from the potential rules 1504 to include in the rules 1502 and then add the selected rules to the rules 1502. In particular, the network communication model generator 1120 may iterate over the potential rules 1504 and, at each iteration, select the rule whose match subset (in the match data 1118) has the largest intersection with the set of remaining unique matches (that is, not already covered by a previously-selected rule) and add the selected rule to the rules 1502. The network communication model generator 1120 may repeat this process until there are no rules in the potential rules 1504 which match any remaining unique matches in the match data 1118, or until a particular coverage goal is achieved.

Embodiments of the present invention may apply weighting to the process of generating the rules 1502 in any of a variety of ways. For example, rules from the potential rules 1504 may be chosen for inclusion in the rules 1502 based on the cardinality of their subset, i.e.:

$$uniqueWeight(C)=length(matchSubset[C]).$$

Alternatively, for example, rules from the potential rules 1504 may be chosen for inclusion in the rules based on the sum of the uniqueMatch counts for each item in the subset, i.e.:

totalWeight(*C*)=sum(uniqueMatchCount[*m*] for *m* in matchSubset[*C*])

As yet another example, the network communication model generator 1120 may associate each of the potential rules 1504 with the frequency of the rule being found in the match data 1118. In other words, if two candidate rules are observed M and N times, respectively, in the match data 1118 (which may be information supplied by the FP-Growth algorithm), and M>>N then the network communication model generator 1120 may prefer the potential rule associated with count N for inclusion in the rules 502, since it carries more information with respect to the match data 118.

As yet another example, the network communication model generator 1120 may count individual features in each of the potential rules 1504 and prefer rules with less common features over rules with more common features. As yet another example, the network communication model generator 1120 may prefer longer rules in the potential rules 1504 over shorter rules in the potential rules 1504. As yet another example, the network communication model generator 1120 may prefer rules in the potential rules 1504 which have certain features (or certain combinations of features) over rules not having those features (or combinations of features).

The network communication model generator 1120 may use any one or more of the measures described above, in any combination, to select rules from the potential rules 1504 in the rules 1502. For example, the network communication model generator 1120 may combine one or more of the measures described above into an "objective" function, and use the objective function to select rules from the potential rules 1504 to include in the rules 1502, and then to add the selected rules to the rules 1502. For example, the network communication model generator 1120 may combine one or more of the measures described above into a single function by adding them together. Furthermore, each feature may be multiplied by a factor that is larger when the feature is more "important," such as by stipulation, or as a result of training on sample sets of data with vetted rules. In another embodiment, one or more of the measures described above are combined into a set of semi-numerical meta-rules, which select a "best" rule from the potential rules 1504 for inclusion in the rules 1502.

Any use described herein of a greedy algorithm may instead be implemented using a Bayesian algorithm to search through the space of possible rule sets. A Bayesian algorithm may, for example, be implemented using a Markov Chain Monte Carlo (MCMC) algorithm or simulated annealing to search for an optimal rule set. All such approaches may be used to add rules to the rules 1502, to replace rules in the rules 1502, and to delete rules from the rules 1502. Any such move (i.e., addition, replacement, or deletion) may be selected based on the objective function described herein. Then, embodiments of the present invention may accept or reject the move, with a probability that depends on the quality of the new set of rules being better or not much worse than the current rule set. Eventually, embodiments of the present invention converge on a nearly optimal set of rules 1502.

In general, one advantage of embodiments of the present invention is that they may be used to generate the network communication model automatically by observing and analyzing existing network communications. This solution eliminates various problems associated with manual network communication model generation, such as the amount of time and effort required to generate and update such a model manually.

Another advantage of embodiments of the present invention is that they may be used to generate the network communication model even in the absence of training data in which particular network communications are labeled as "healthy" (i.e., desired to be permitted) or "unhealthy" (i.e., desired to be blocked), while striking a balance between being permissive enough to permit healthy but previously unseen network communications (e.g., network communications that have properties different than the communications that were used to generate the model 104) and being restrictive enough to block previously-unseen and unhealthy network communications.

Microseqmentation

Workload segmentation includes an approach to segment application workloads. In an automated manner, with one click, the workload segmentation determines risk and applies identity-based protection to workloads—without any changes to the network. The software identity-based technology provides gap-free protection with policies that automatically adapt to environmental changes.

Microsegmentation originated as a way to moderate traffic between servers in the same network segment. It has evolved to include intra-segment traffic so that Server A can talk to Server B or Application A can communicate with Host B, and so on, as long as the identity of the requesting resource (server/application/host/user) matches the permission configured for that resource. Policies and permissions for microsegmentation can be based on resource identity, making it independent from the underlying infrastructure, unlike network segmentation, which relies on network addresses. This makes microsegmentation an ideal technique for creating intelligent groupings of workloads based on the characteristics of the workloads communicating inside the data center. Microsegmentation, a fundamental part of the Zero Trust Network Access (ZTNA) framework, is not reliant on dynamically changing networks or the business or technical requirements placed on them, so it is both stronger and more reliable security. It is also far simpler to manage—a segment can be protected with just a few identity-based policies instead of hundreds of address-based rules.

Figure 14:
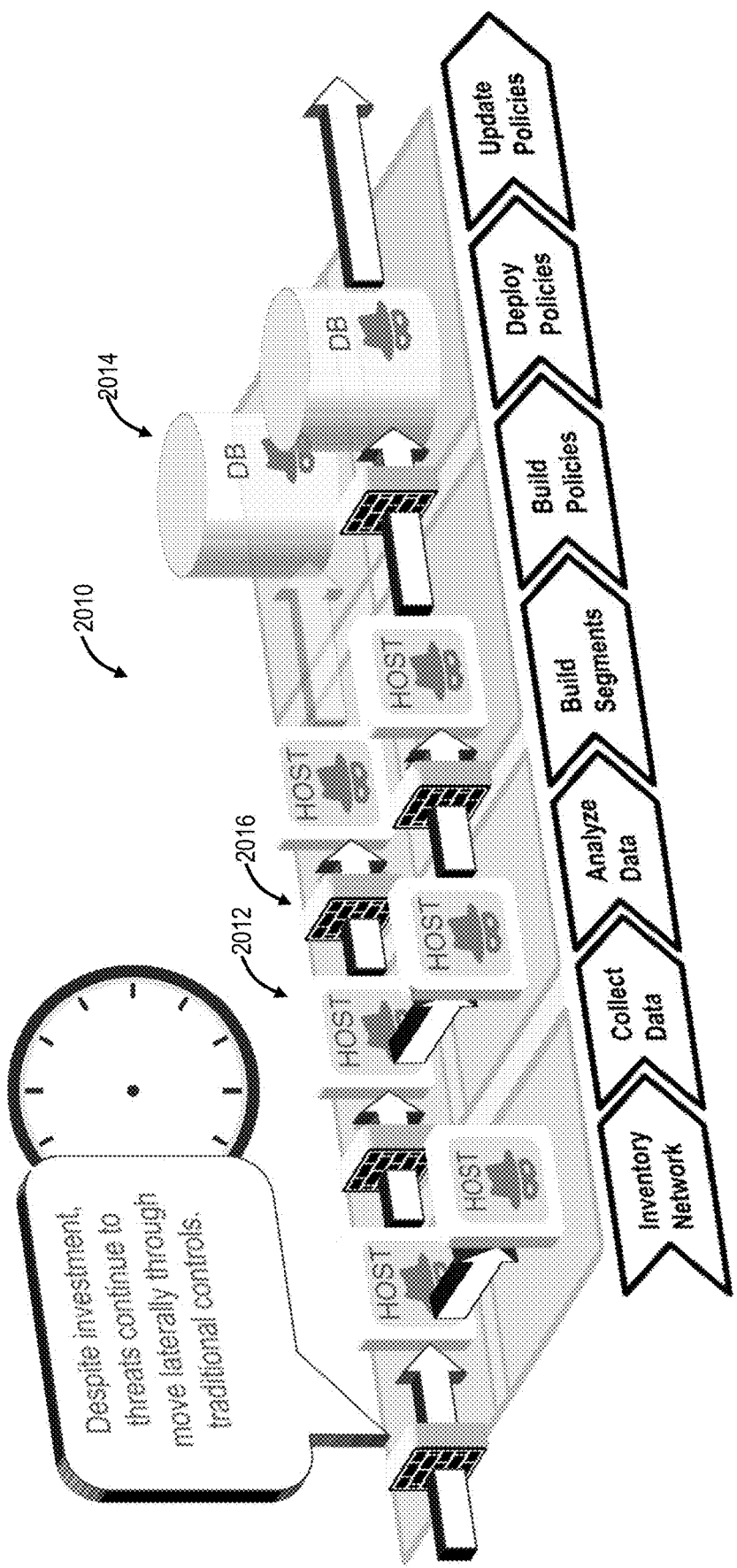
FIG. 14 is a network diagram of a network illustrating conventional microsegmentation.

FIG. 14 is a network diagram of a network 2010 illustrating conventional microsegmentation. The network 2010 includes hosts 2012, databases 2014, and firewalls 2016. Legacy network-based microsegmentation solutions rely on the firewalls 2016, which use network addresses for enforcing rules. This reliance on network addresses is problematic because networks constantly change, which means policies must be continually updated as applications and devices move. The constant updates are a challenge in a data center, and even more so in the cloud and where Internet Protocols (IP) addresses are ephemeral. Network address-based approaches for segmentation cannot identify what is communicating—for example, the software's identity—they can only tell how it is communicating, such as the IP address, port, or protocol from which the "request" originated. As long as they are deemed "safe," communications are allowed, even though IT does not know exactly what is trying to communicate. Furthermore, once an entity is inside a network zone, the entity is trusted. But this trust model can lead to breaches, and that is one major reason microsegmentation evolved.

Figure 15:
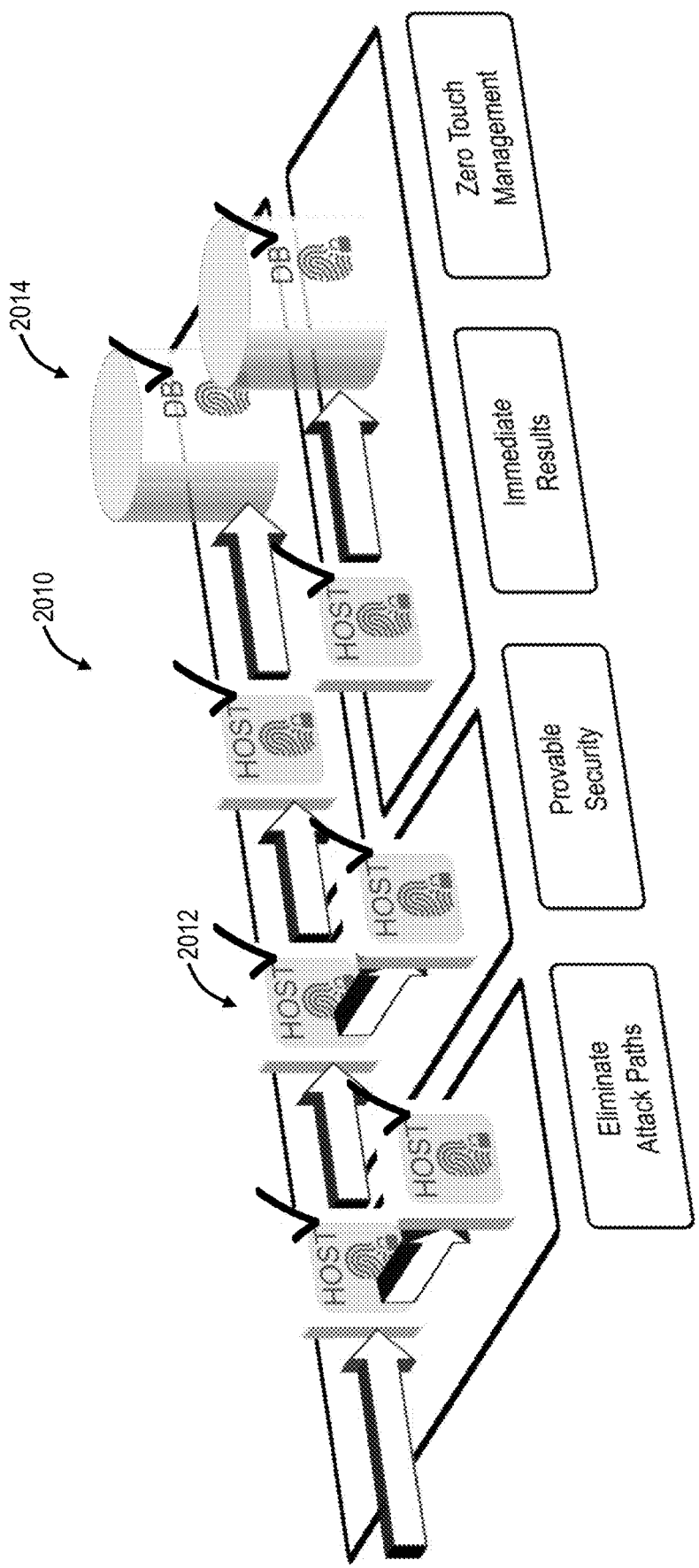
FIG. 15 is a network diagram of a network illustrating automated microsegmentation.

FIG. 15 is a network diagram of the network 2010 illustrating automated microsegmentation. Microsegmentation is a way to create secure zones so that companies can isolate workloads from one another and secure them individually. It is designed to enable granular partitioning of traffic to provide greater attack resistance. With microsegmentation, IT teams can tailor security settings to different traffic types, creating policies that limit network and application flows between workloads to those that are explicitly permitted. In this zero trust security model, a company could set up a policy, for example, that states medical devices can only talk to other medical devices. And if a device or workload moves, the security policies and attributes move with it. By applying segmentation rules down to the workload or application, IT can reduce the risk of an attacker moving from one compromised workload or application to another.

Microsegmentation is not the same as network segmentation. It is fairly common for network segmentation and microsegmentation to be used interchangeably. In reality, they are completely different concepts. Network segmentation is best used for north-south traffic, meaning the traffic that moves into and out of the network. With network segmentation, an entity, such as a user, is generally considered trusted once inside a network's designated zone. Microsegmentation is best used for east-west traffic, or traffic that moves across the data center network—server-to-server, application-to-server, etc. Simply put, network segmentation is the castle's outer walls, while microsegmentation represents the guards standing at each of the castle's doors.

Microsegmentation's main purpose is to reduce the network attack surface by limiting east-west communication by applying granular security controls at the workload level. In the simplest terms, the differences between microsegmentation and network segmentation can be boiled down to:

| Segmentation | Microsegmentation |
| --- | --- |
| Coarse policies | Granular policies |
| Physical network | Virtual or overlay network |
| North-south traffic | East-west traffic |
| Address based/network level | Identity-based/workload level |
| Hardware | Software |

Since policies and permissions for microsegmentation are based on resource identity (versus a user's/person's identity), it is independent of the underlying infrastructure, which means: Fewer policies to manage, centralized policy management across networks, policies that automatically adapt regardless of infrastructure changes, and gap-free protection across cloud, container, and on-premises data centers.

Generally, microsegmentation creates intelligent groupings of workloads based on characteristics of the workloads communicating inside the data center. As such, microsegmentation is not reliant on dynamically changing networks or the business or technical requirements placed on them, which means that it is both stronger and more reliable security.

Automated Microsegmentation

With the network communication model 11104 and the network communication policies 118, the systems 100, 1000 can include automatic microsegmentation, as illustrated in FIG. 15. Of note, machine learning is ideal for detecting normal (healthy) and abnormal (unhealthy) communications and is ideal for automating microsegmentation. That is, the model 1104 can be used to automatically create microsegments.

Figure 16:
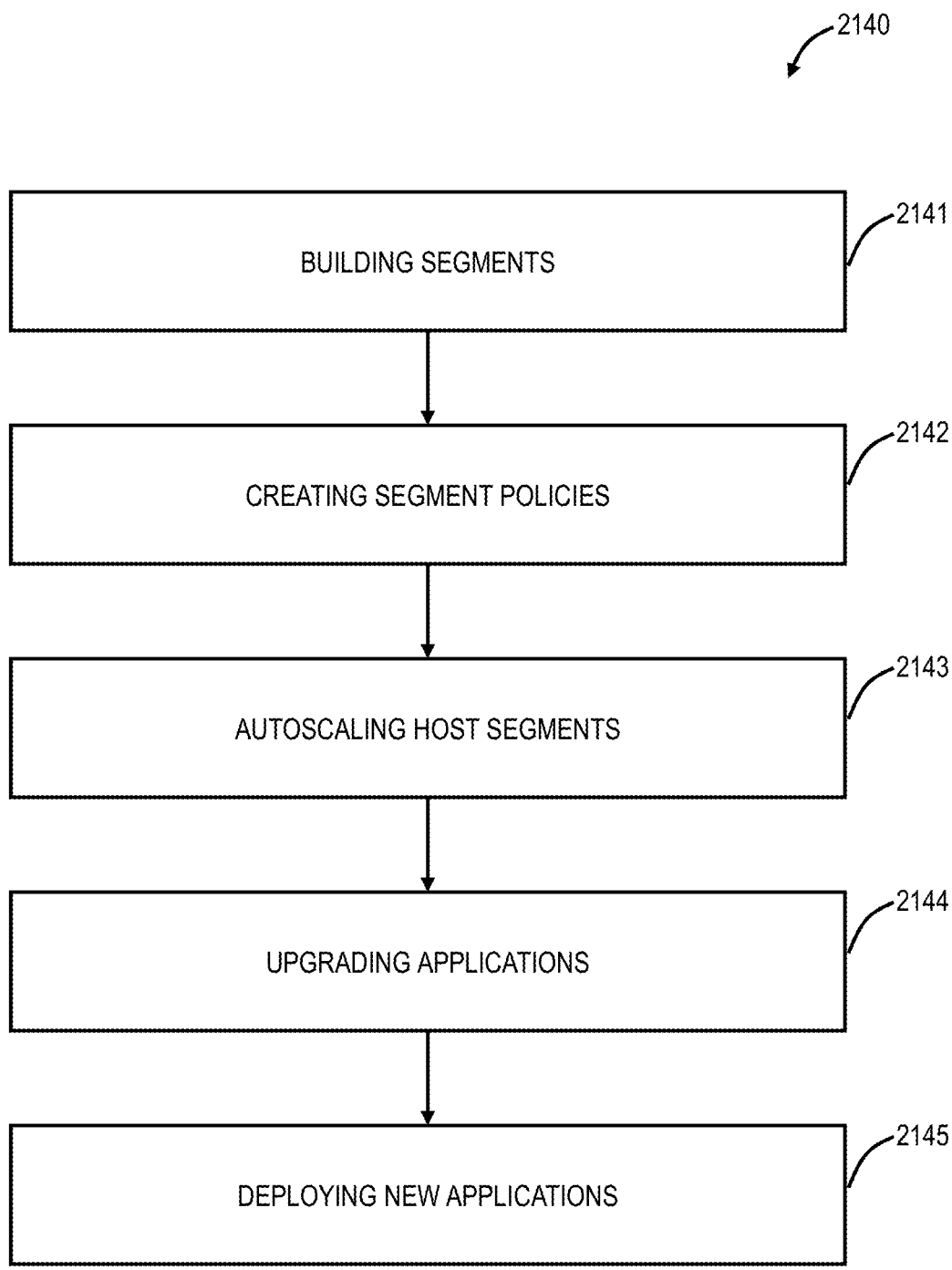
FIG. 16 is a flowchart of an automated microsegmentation process.

FIG. 16 is a flowchart of an automated microsegmentation process 2140. The automated microsegmentation process 2140 includes building segments (step 2141), creating segment policies (step 2142), autoscaling host segments (step 2143), upgrading applications (step 2144), and deploying new applications (step 2145). The steps 2141, 2142 include machine learning to develop the model 1104. After steps 2141, 2142, the automated microsegmentation process 2140 contemplates dynamic operation to autoscale segments as needed, and to identify upgraded applications and newly deployed applications.

The automated microsegmentation process 2140 advantageously performs the vast majority of the work required to microsegment the network automatically, possibly leaving only the task of review and approval to the user. This saves a significant amount of time and increases the quality of the microsegmentation compared to microsegmentation solely performed manually by one or more humans.

In general, automated microsegmentation process 2140 can perform some or all of the following steps to perform microsegmenting of a network:

(a) Automatically surveying the network to find its functional components and their interrelations.

(b) Automatically creating one or more subgroups of hosts on the network, where each subgroup corresponds to a functional component. Each such subgroup is an example of a microsegment. A functional component may, for example, be or include a set of hosts that are similar to each other, as measured by one or more criteria. In other words, all of the hosts in a particular functional component may satisfy the same similarity criteria as each other. For example, if a set of hosts communicate with each other much more than expected, in comparison to how much they communicate with other hosts, then embodiments can define that set of hosts as a functional component and as a microsegment. As another example, if hosts in a first set of hosts communicate with hosts in a second set of hosts, then embodiments can define the first set of hosts as a functional component and as a microsegment, whether or not the first set of hosts communicates amongst themselves. As yet another example, embodiments can define a set of hosts that have the same set of software installed on them (e.g., operating system and/or applications) as a functional component and as a microsegment. "Creating," "defining," "generating," "identifying" a microsegment may, for example, include determining that a plurality of hosts satisfy particular similarity criteria, and generating and storing data indicating that the identified plurality of hosts form a particular microsegment.

(c) For each microsegment identified above, automatically identifying existing network application security policies that control access to hosts in that microsegment. For example, embodiments of the present invention may identify existing policies that govern (e.g., allow and/or disallow) inbound connections (i.e., connections into the microsegment, for which hosts in the microsegment are destinations) and/or existing policies that govern (e.g., allow and/or disallow) for outbound connections (i.e., connections from the microsegment, for which hosts in the microsegment are sources). If the microsegmentation(s) were generated well, then the identified policies may govern connections between microsegments, in addition to individual hosts inside and outside each microsegment.

(d) Providing output to a human user representing each defined microsegment, such as by listing names and/or IP addresses of the hosts in each of the proposed microsegments. This output may be provided, for example, through a programmatic Application Program Interface (API) to another computer program or by providing output directly through a user interface to a user.

(e) Receiving input from the user in response to the output representing the microsegment. If the user's input indicates approval of the microsegment, then embodiments of the present invention may, in response, automatically enforce the identified existing network application policies that control access to hosts in the now-approved microsegment. If the user's input does not indicate approval of the microsegment, then embodiments of the present invention may, in response, automatically not enforce the identified existing network application policies that control access to hosts in the now-approved microsegment.

In prior art approaches (FIG. 14), most or all steps in the microsegmenting process are performed manually and can be extremely tedious, time-consuming, and error-prone for humans to perform. When such functions are otherwise attempted to be performed manually, they can involve months or even years of human effort, and often they are never completed. One reason for this is the task's inherent complexity. Another reason is that no network is static; new hosts and new functional requirements continue to rise over time. If microsegmentation policies are not updated over time, those new requirements cannot be satisfied, and the existing microsegmentations become obsolete and potentially dangerously insecure.

Embodiments of the present invention improve upon the prior art by performing a variety of functions above automatically and thereby eliminating the need for human users to perform those functions manually, such as:

automatically defining the sets of source and destination network host-application pairs that are involved in the policies to be applied to the microsegment;

automatically establishing the desired behavior in the microsegment, including but not limited to answering the questions: (a) are the policies that apply to the microsegment intended to allow or to block communications between the two host-application sets; and (b) are the policies that apply to the microsegment intended to allow or block communications within the host-application sets?; and automatically configuring and applying rules for each of the desired behaviors above so that they can be executed by the agents on the hosts. The automated microsegmentation process 2140 can repeat multiple times over time: identifying (or updating existing) microsegments; identifying updated network application security policies and applying those updated policies to existing or updated microsegments; prompting the user for approval of new and/or updated microsegments; and applying the identified network application security policies only if the user approves of the new and/or updated microsegments.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A method comprising:
  receiving network communication information that describes flows between hosts in a network and applications executed on the hosts;
  generating a network communication model based on the network communication information, wherein the generating the network communication model comprises automatically selecting, from among a plurality of available constraints, one or more constraints comprising at least human readability or human modifiability, and applying the selected constraints to produce labeled network flows in the network communication mode; and
  providing policies to the hosts based on the network communication model where the policies cause performance a set of actions, locally at a host, on any of the flows based on corresponding labels, wherein the policies are provided to the host based on one or more automatically generated microsegments defined by an identity-based protection policy at a workload, the workload is application-centric and independent of a network structure and configured to enable granular security via the microsegments.

2. The method of claim 1, wherein the labeled network flows are one of healthy and unhealthy.

3. The method of claim 1, wherein the set of actions include blocking, allowing, and allowing for a period of time before confirmation.

4. The method of claim 1, wherein the labeled network flows are one of healthy and unhealthy, and wherein the set of actions include blocking, allowing, and allowing for a period of time before confirmation.

5. The method of claim 1, wherein the policies are configured to govern a connection between the one or more microsegments on the network by applying granular security controls at a workload level, the connection defined by an east-west connection.

6. The method of claim 1, wherein the labeled network flows are multiple sequential flows combined into a single flow and are internal workload communications defining east-west traffic.

7. The method of claim 1, further comprising
providing output to a user representing the one or more microsegments;
receiving policy decisions for hosts based on the set of actions; and
performing a reconciliation that can include causing termination of a flow after being allowed.

8. A non-transitory computer-readable medium having computer program instructions stored thereon, the computer program instructions being executable by at least one computer processor communicatively coupled to a network to perform steps of:
receiving network communication information that describes flows between hosts in the network and applications executed on the hosts;
generating a network communication model based on the network communication information, wherein the generating the network communication model comprises automatically selecting, from among a plurality of available constraints, one or more constraints comprising at least human readability or human modifiability, and applying the selected constraints to produce labeled network flows in the network communication mode; and
providing policies to the hosts based on the network communication model where the policies cause performance a set of actions, locally at a host, on any of the flows based on corresponding labels, wherein the policies are provided to the host based on one or more automatically generated microsegments defined by an identity-based protection policy at a workload, the workload is application-centric and independent of a network structure and configured to enable granular security via the microsegments.

9. The non-transitory computer-readable medium of claim 8, wherein the labeled network flows are one of healthy and unhealthy.

10. The non-transitory computer-readable medium of claim 8, wherein the set of actions include blocking, allowing, and allowing for a period of time before confirmation.

11. The non-transitory computer-readable medium of claim 8, wherein the labeled network flows are one of healthy and unhealthy, and wherein the set of actions include blocking, allowing, and allowing for a period of time before confirmation.

12. The non-transitory computer-readable medium of claim 8, wherein the policies define microsegments on the network.

13. The non-transitory computer-readable medium of claim 8, wherein the labeled network flows are internal workload communications.

14. The non-transitory computer-readable medium of claim 8, wherein the steps further include
receiving policy decisions for hosts based on the set of actions; and
performing a reconciliation that can include causing termination of a flow after being allowed.

15. A system comprising at least one processor and memory storing instructions that, when executed, cause the at least one processor to:
receive network communication information that describes flows between hosts in a network and applications executed on the hosts;
generate a network communication model based on the network communication information, wherein the generating the network communication model comprises automatically selecting, from among a plurality of available constraints, one or more constraints comprising at least human readability or human modifiability, and applying the selected constraints to produce labeled network flows in the network communication mode; and
provide policies to the hosts based on the network communication model where the policies cause performance a set of actions, locally at a host, on any of the flows based on corresponding labels, wherein the policies are provided to the host based on one or more automatically generated microsegments defined by an identity-based protection policy at a workload, the workload is application-centric and independent of a network structure and configured to enable granular security via the microsegments.

16. The system of claim 15, wherein the ed network flows are one of healthy and unhealthy.

17. The system of claim 15, wherein the set of actions include blocking, allowing, and allowing for a period of time before confirmation.

18. The system of claim 15, wherein the labeled network flows are one of healthy and unhealthy, and wherein the set of actions include blocking, allowing, and allowing for a period of time before confirmation.

19. The system of claim 15, wherein the policies define microsegments on the network.

20. The system of claim 15, wherein the labeled network flows are internal workload communications.

* * * * *